United States Patent
Pearlson

(10) Patent No.: US 10,012,484 B2
(45) Date of Patent: Jul. 3, 2018

(54) METHOD OF IMPROVING THE ACCURACY OF RIFLE AMMUNITION

(71) Applicant: ADR INTERNATIONAL LIMITED, Camara Bay (KY)

(72) Inventor: Daniel David Pearlson, Pacific Palisades, CA (US)

(*) Notice: Subject to any disclaimer, the term of this patent is extended or adjusted under 35 U.S.C. 154(b) by 488 days.

(21) Appl. No.: 14/464,339

(22) Filed: Aug. 20, 2014

(65) Prior Publication Data
US 2016/0258723 A1 Sep. 8, 2016

Related U.S. Application Data

(60) Provisional application No. 61/947,274, filed on Mar. 3, 2014.

(51) Int. Cl.
| | |
|---|---|
| F42B 33/10 | (2006.01) |
| F42B 5/16 | (2006.01) |
| B65G 65/40 | (2006.01) |
| G01G 13/04 | (2006.01) |
| G01G 13/16 | (2006.01) |
| G01G 13/24 | (2006.01) |
| F42B 33/02 | (2006.01) |

(52) U.S. Cl.
CPC ............... *F42B 5/16* (2013.01); *B65G 65/40* (2013.01); *F42B 33/02* (2013.01); *F42B 33/0207* (2013.01); *F42B 33/0264* (2013.01); *F42B 33/0285* (2013.01); *F42B 33/0292* (2013.01); *G01G 13/04* (2013.01); *G01G 13/16* (2013.01); *G01G 13/247* (2013.01)

(58) Field of Classification Search
USPC ....................... 86/31, 23; 102/430
See application file for complete search history.

(56) References Cited

U.S. PATENT DOCUMENTS

| | | |
|---|---|---|
| 795,423 A | 7/1905 | Wheeler et al. |
| 906,214 A | 12/1908 | Freeman |
| 1,891,038 A | 12/1932 | Barros |
| 1,978,558 A | 10/1934 | Van Der Horst |
| 2,539,030 A | 1/1951 | Parker |
| 2,588,206 A | 3/1952 | Clark |
| 2,661,876 A | 12/1953 | Kindseth |

(Continued)

FOREIGN PATENT DOCUMENTS

GB 858844 A 8/1976

OTHER PUBLICATIONS

Developing a Load for Competition Shooting, Part 1, by Clary et al; 2008, http//www.chuckhawks.com/developing_target_load.htm.*

(Continued)

*Primary Examiner* — John W Eldred
(74) *Attorney, Agent, or Firm* — Dinsmore & Shohl LLP; Monika L'Orsa Jaensson, Esq.

(57) ABSTRACT

A method of supplying a rifle with cartridges includes providing classes within a group of cartridges. The classes are classified by specific and precisely graduated increments of propellant load contained in the cartridges, or by formulation of propellant, of each class relative to the cartridges of each other class. The user can test fire a rifle with multiple classes of the group and record the accuracy of the firing. A class of the group can be then chosen for a particular rifle based on accuracy of the rifle in the test firing.

19 Claims, 24 Drawing Sheets

(56) References Cited

U.S. PATENT DOCUMENTS

| | | |
|---|---|---|
| 3,140,018 A | 7/1964 | Miller |
| 3,340,641 A | 9/1967 | Recker |
| 3,407,656 A | 10/1968 | Chadenson et al. |
| 3,654,970 A | 4/1972 | Teboul |
| 3,708,025 A | 1/1973 | Soler et al. |
| 3,774,818 A | 11/1973 | Alexandrov et al. |
| 3,783,957 A | 1/1974 | Borghi |
| 3,802,522 A | 4/1974 | Thompson et al. |
| 3,827,513 A | 8/1974 | Epstein |
| 3,938,440 A | 2/1976 | Dooley et al. |
| 3,977,483 A | 8/1976 | Greanias |
| 4,002,268 A | 1/1977 | McKinney |
| 4,042,412 A | 8/1977 | Williams et al. |
| 4,108,337 A | 8/1978 | Iijima |
| 4,559,981 A | 12/1985 | Hirano |
| 4,696,356 A | 9/1987 | Ellion et al. |
| 4,893,966 A | 1/1990 | Roehl |
| 5,005,657 A | 4/1991 | Ellion et al. |
| 5,064,009 A | 11/1991 | Melcher et al. |
| 5,279,200 A | 1/1994 | Rose |
| 5,332,870 A | 7/1994 | Strickler |
| 5,398,557 A | 3/1995 | Shimizu et al. |
| 5,409,137 A | 4/1995 | Bonomelli |
| 5,437,393 A | 8/1995 | Blicher et al. |
| 5,542,583 A | 8/1996 | Boyer et al. |
| 5,602,485 A | 2/1997 | Mayer et al. |
| 5,753,868 A | 5/1998 | Diem |
| 5,796,052 A | 8/1998 | Christmann et al. |
| 5,798,473 A | 8/1998 | Roblyer et al. |
| 6,056,027 A | 5/2000 | Patterson |
| 6,121,556 A * | 9/2000 | Cole ............... G01G 13/04 141/83 |
| 6,283,680 B1 | 9/2001 | Vidal |
| 6,472,615 B1 | 10/2002 | Carlson |
| 6,911,607 B2 | 6/2005 | Klijn |
| 7,383,971 B2 | 6/2008 | Hanaoka |
| 7,472,808 B2 | 1/2009 | Hanaoka et al. |
| 8,312,663 B2 | 11/2012 | Johnson |
| 9,221,561 B2 | 12/2015 | Maheshwari et al. |
| 2004/0245027 A1 | 12/2004 | Kawanishi et al. |
| 2005/0056339 A1 | 3/2005 | Beane |
| 2007/0131707 A1 | 6/2007 | Poole et al. |
| 2012/0227302 A1 | 9/2012 | Fonte |
| 2013/0139675 A1 | 6/2013 | Baxter et al. |
| 2014/0014414 A1 | 1/2014 | Kawanishi et al. |

OTHER PUBLICATIONS

Developing an Accurate Load, Feb. 1, 2012, https://web.archive.org/web/20130928072745/http://www.frfrogspad.com/loaddev.htm.*
International Search Report and Written Opinion pertaining to PCT/US2015/018542 dated Jul. 6, 2015.
International Preliminary Report on Patentability pertaining to PCT/US2015/018542 dated Sep. 15, 2016.

* cited by examiner

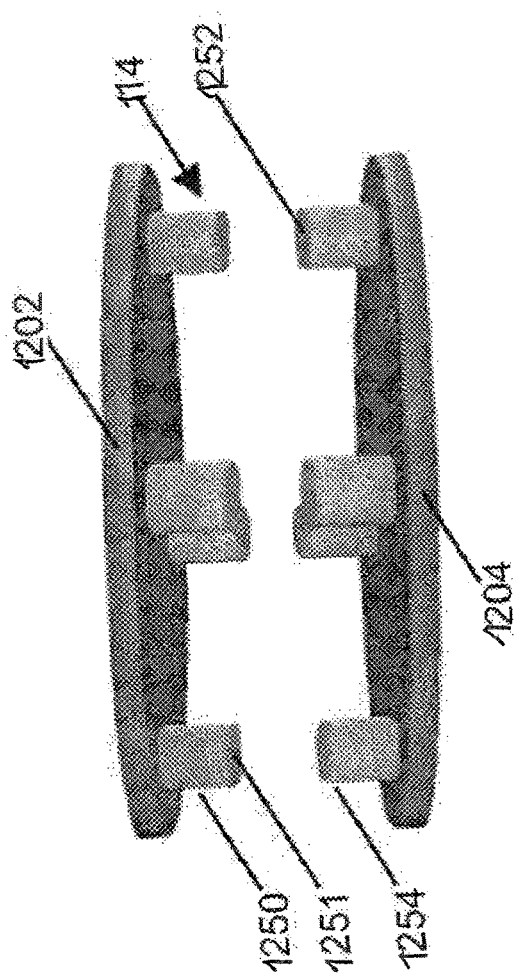
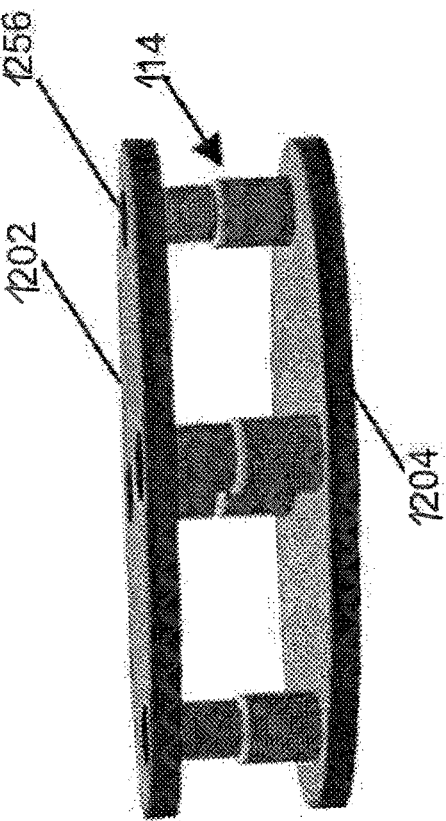
FIG. 8
FIG 8A

METHOD OF IMPROVING THE ACCURACY OF RIFLE AMMUNITION

The application claims the benefit of U.S. Provisional Patent Application 61/947,274, filed Mar. 3, 2014.

FIELD

The present invention relates generally to projectiles fired or launched along the center line of an apparatus with a cantilever portion from which a projectile is fired or launched; and in particular, to vibrations of the cantilever component of such an apparatus. More specifically, the present invention relates to rifles, where the rifle barrel is a cantilever portion, and methods for increasing the accuracy of projectiles fired from the rifle.

BACKGROUND

While the precision with which mass-produced, commercially available ammunition has substantially improved over many decades, a plateau has been reached in the accuracy of highly uniform ammunition. It is well known that when a round of ammunition is discharged through any rifled barrel, the barrel exhibits vibrations that can significantly reduce accuracy. These vibrations perturb the trajectory of a projectile as it exits the rifle barrel's muzzle. Prior art teaches the use of mechanical attachments to dampen the amplitude of such vibration so as to observably improve accuracy as evidenced by random scatter in target groupings of successively fired projectiles. Moreover, prior art pertaining to mass production of highly accurate ammunition has focused on the precision of manufacture of precisely uniform ammunition, including undifferentiated cartridge configurations, propellant loads, and projectiles, that are made for use with any rifle or firearm capable of firing the same caliber and cartridge configuration.

The vibration of a rifle's barrel upon firing of a projectile is comprised by transverse waves, harmonic resonances, axial compression waves caused by the acceleration of a projectile's inertial mass as it is axially rotated or "twisted" by barrel rifling, by acoustic pressure waves conducted through the firearm's barrel material and expanding gasses from the combustion of propellant from the cartridge. The interaction of off-axis attachments to the barrel, including the rifle stock, scopes, flash guards, and other masses, significantly contribute to the alteration of the barrel's vibration, thereby, in each instance, modifying the waveform dynamics of any particular individual rifle. All of the hereinabove stated constituents of rifle barrel waveform dynamics are hereinafter referred to as barrel "harmonics."

One of the most effective ways to discover a means of reducing the random scatter in target groupings of successively fired projectiles from a particular, individual, and specific rifle is to experiment with specific and precisely graduated increments of the amount of propellant loaded in ammunition cartridges so as to determine the amount of propellant necessary to achieve observably optimum accuracy. This process is referred to as "tuning" or "timing" the ammunition for a particular, individual, and specific rifle. Experimental evidence conclusively demonstrates the efficaciousness of this process by demonstrating significant and substantial reduction of random scatter in target groupings of successively fired projectiles.

Once an optimal propellant charge has been determined for use with a particular, individual, and specific rifle, precisely uniform ammunition for that rifle must thereafter be loaded with an identical measure of propellant so as to achieve and maintain consistent accuracy.

An optimum propellant charge can significantly improve the relative accuracy of any rifle, including those of the same make and model, regardless of ammunition caliber, and regardless of any of a multiplicity of configurations including, but not limited to, rifle barrel length and taper, stock configuration including shape and material, and the post manufacture addition of various appliances such as scopes and other devices. While comparable results can be achieved by means of manual loading of the precisely optimal measure of propellant for a particular, individual, and specific rifle, such manual loading requires considerable skill, painstaking attention to detail, specialized assembly equipment, highly accurate measurement equipment, sufficient workspace, the storage and use of hazardous component materials, and a significant amount of time and financial investment.

The practical application of the present invention, whether used alone or in conjunction with mechanical attachments to dampen the amplitude of vibration, significantly and substantially improves the accuracy of projectiles than can otherwise be achieved utilizing precisely uniform ammunition intended for use in any rifle capable of utilizing that caliber and cartridge configuration.

SUMMARY

The present invention is a method for providing ammunition in propellant classes that, one of which may be selected to improve the accuracy of a plurality of specific rifles. The different classes precisely synchronize the acceleration and subsequent exit of a projectile from the muzzle of a rifle barrel to coincide with reduced physical distortions of the barrel caused by the interaction of the projectile with the barrel's unique harmonic attributes.

Matching the propellant load of the ammunition to the rifle can improve accuracy from more than 1 arc minute to within 7 arc seconds. An arc minute is about 1 inch per 100 yards. Overall, harmonically tuned ammunition can be up to ten times more accurate than an "off-the-shelf" non-tuned variety, depending on the harmonic attributes of a given particular rifle.

Exemplary methods of the invention include providing ammunition cartridges for use in a rifle, comprising the steps of:

providing multiple cartridges for use in a particular rifle and dividing the multiple cartridges into classes where each class is differentiated by specific and precisely graduated increments of propellant load contained in each class relative to each other class.

Furthermore, a customer can experiment with a range of classes within a type of ammunition product category to enable the identification and selection of the optimal class of ammunition for a particular, individual, and specific rifle.

The optimal selection of the class of ammunition more uniformly accelerates the projectile of such class of ammunition to cause and closely coincide with a period of harmonically attenuated vibration as the projectile exits the muzzle of a specific, particular, and individual rifle.

The period of harmonically attenuated amplitude of vibration reduces deflection, or more particularly, induced perturbation of the trajectory of a fired projectile.

Reduction of the perturbation of a fired projectile results in significant and substantial improvement in accuracy as evidenced by the reduction of random scatter in target groupings of successively fired projectiles of the same optimal class.

A customer's selection and purchase of an optimally accurate class of ammunition is convenient, eliminates the need for considerable skill on the part of an end user in the manual assembly of "timed" or "tuned" optimized ammunition propellant loads, eliminates the need for the customer to expend painstaking attention to detail in the assembly of optimal ammunition, eliminates the need for the customer to expend resources to obtain specialized assembly equipment or highly accurate measurement equipment, and sufficient and appropriate workspace to assemble custom ammunition for a particular, specific, individual firearm that is more accurate when used in the unique firearm than ammunition manufactured for general use in a non-specific firearm, eliminates the need for the customer to store, use, and manipulate hazardous component materials, and eliminates the need for the customer to expend significant time and financial resources in the assembly of custom ammunition.

An economy of scale in the production of such classes of product can reduce the cost of manufacture of such product relative to custom manufactured product that may be made specifically for use with a particular, individual, and specific rifle, can increase profit in the manufacture of such product relative to custom manufactured product that may be made specifically for use with a particular, individual, and specific rifle, and can reduce the cost to customers of product relative to custom manufactured product that may be made specifically for use with a particular, individual, and specific rifle.

Product distribution, by means of direct sales, wholesale distribution, and retail distribution, of ammunition to end users is demonstrably, significantly, and substantially more accurate, as evidenced by reduced random scatter in target groupings of successively fired projectiles of the same optimal class, than any mass produced ammunition not "timed" or "tuned" to a customer's particular, individual, and specific firearm, is accomplished.

To achieve the cost effective mass production of "timed" or "tuned" harmonically resonant ammunition, each of the different classes of precisely graduated loads of propellant can be portioned by weight. This is best accomplished by means of an automated process whereby, prior to insertion into cartridge cases during an automated cartridge assembly process, each propellant load is accurately weighed and incrementally adjusted as necessary to assure the highest practical precision. In the alternative, the specific impulse of propellant utilized in each class can be of precise weight such that the acceleration of projectiles of each class are predictably differentiated. In both former and later methods, the calibration of precise measures and the portioning process should be performed at a rate equal to the optimal assembly rate of high-speed automated cartridge assembly systems.

A kit can contain a listing of class ranges, or actual selections of product of different classes, of any of a plurality of types of ammunition of uniform caliber and cartridge configuration divided into classes where such caliber and certain cartridge components and configurations are physically uniform, including the primer, cartridge case, and the projectile of each cartridge configuration, but where each class is differentiated by specific and precisely graduated increments of propellant load contained in each class relative to each other class.

A customer's experimentation with the range of classes within the kit enables the identification and selection of the optimally accurate class of ammunition for a particular, individual, and specific rifle by means of evaluation of random scatter in target groupings of successively fired projectiles so as to determine which of the classes is most accurate.

An alternative to use of a kit includes pre-identification of individual firearm characteristics including, but is not limited to, the make, model, and identification of various attachments such as a scope, stocks, flash guards and other fixtures. This information can be used to statistically predict a significantly reduced set of ammunition classes than would otherwise be required to ascertain, by means of experimentation, an optimally accurate class.

BRIEF DESCRIPTION OF THE DRAWINGS

FIG. 8 is an exploded perspective view of a portion of the volumetric portioning part of FIG. 7;

FIG. 8A is a perspective view of the portion shown in FIG. 8 in an assembled state;

DETAIL DESCRIPTION

All of the illustrations (FIGS. 1 through 5) are for the purpose of describing selected versions of the present invention and are not intended to limit the scope of the present invention.

This specification incorporates by reference U.S. Provisional Patent Application 61/947,274, filed Mar. 3, 2014 and U.S. application Ser. No. 14/464,405, filed on Aug. 20, 2014, now U.S. Pat. No. 5,400,6418, issued Mar. 21, 2017.

Figure 1:
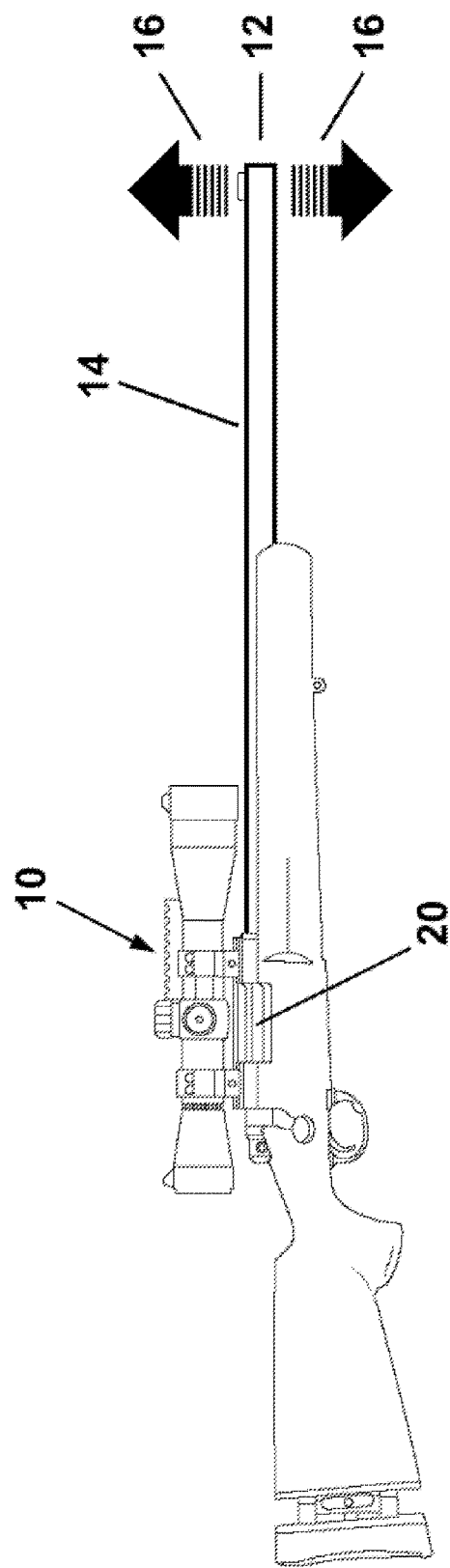
FIG. 1 is an elevation view of a rifle schematically showing vibration of the barrel during firing.

FIG. 1 shows a representation of a rifle 10 and, in particular, the muzzle 12 of a rifle barrel 14 indicating by arrows 16 the location of critical vibration that affects the deflection of the trajectory of a fired projectile.

Figure 2:
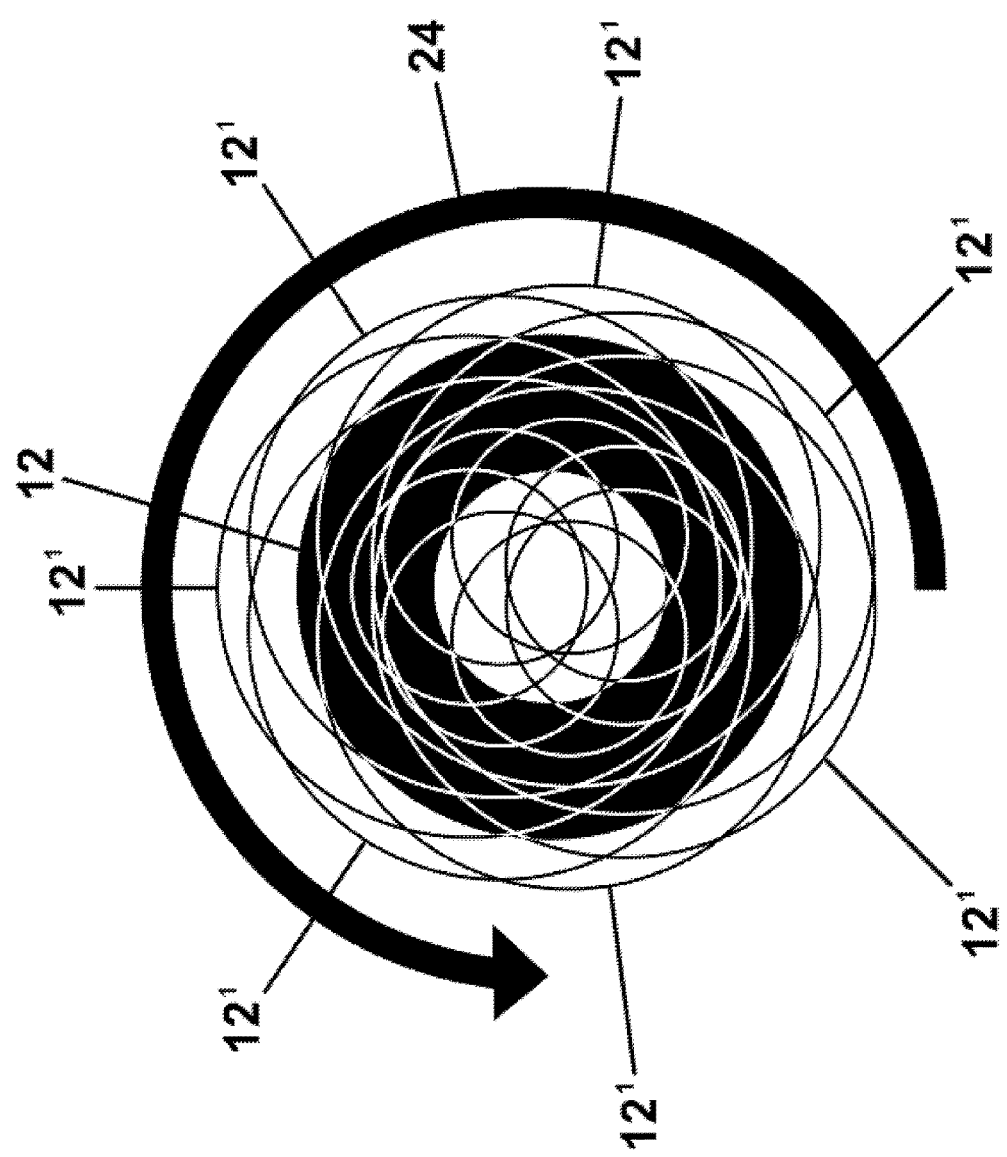
FIG. 2 is a schematic end view, looking down the rifle barrel, schematically showing vibration patterns without use of optimized propellant ammunition.

FIG. 2 shows a representation of the vibration of the rifle muzzle 12, not attenuated by means of the use of an optimum load of propellant, sighting down the barrel 14 from the muzzle 12 toward a chamber 20 as a projectile (not shown) exits the muzzle. The overlaid circles $12^1$ indicate the moving positions of the muzzle 12 during firing. The arrow 24 represents the direction of acceleration of axial rotation, or "twist," resulting from the most common direction of barrel rifling as the projectile moves toward the point of view of the reader.

Figure 3:
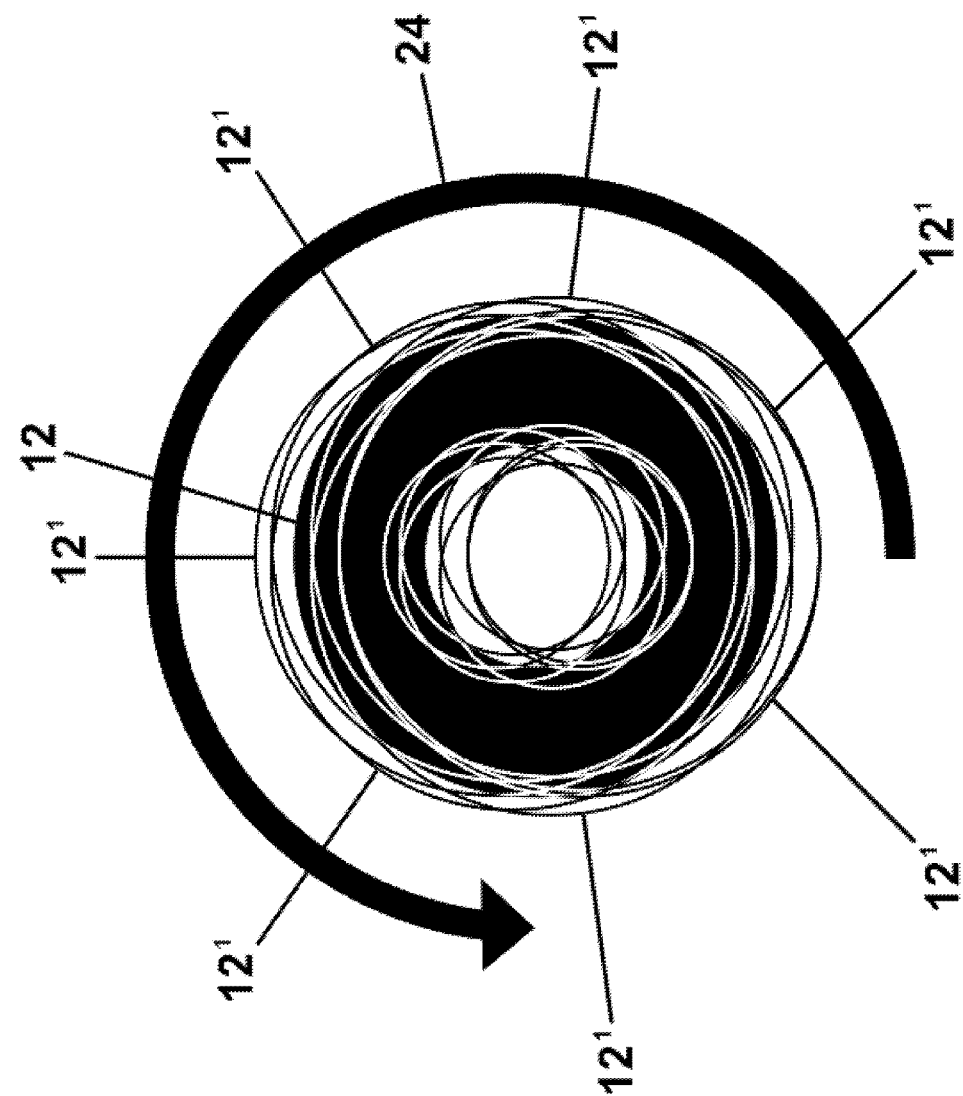
FIG. 3 is a schematic end view of the rifle barrel showing looking down the rifle barrel, schematically showing vibration patterns with use of optimized propellant ammunition.

FIG. 3 shows a representation of the vibration of a rifle muzzle, attenuated by means of the use of an optimum load of propellant, sighting down the barrel from the muzzle toward the chamber as a projectile (not shown) exits the muzzle. The overlaid circles $12^1$ indicate the moving positions of the muzzle 12 during firing. The arrow 24 represents the direction of acceleration of axial rotation, or "twist," resulting from the most common direction of barrel rifling as the projectile moves toward the point of view of the reader. In comparison to FIG. 2 it is apparent that the muzzle 12 moves in a more restricted pattern of circles $12^1$ during firing.

Figure 4:
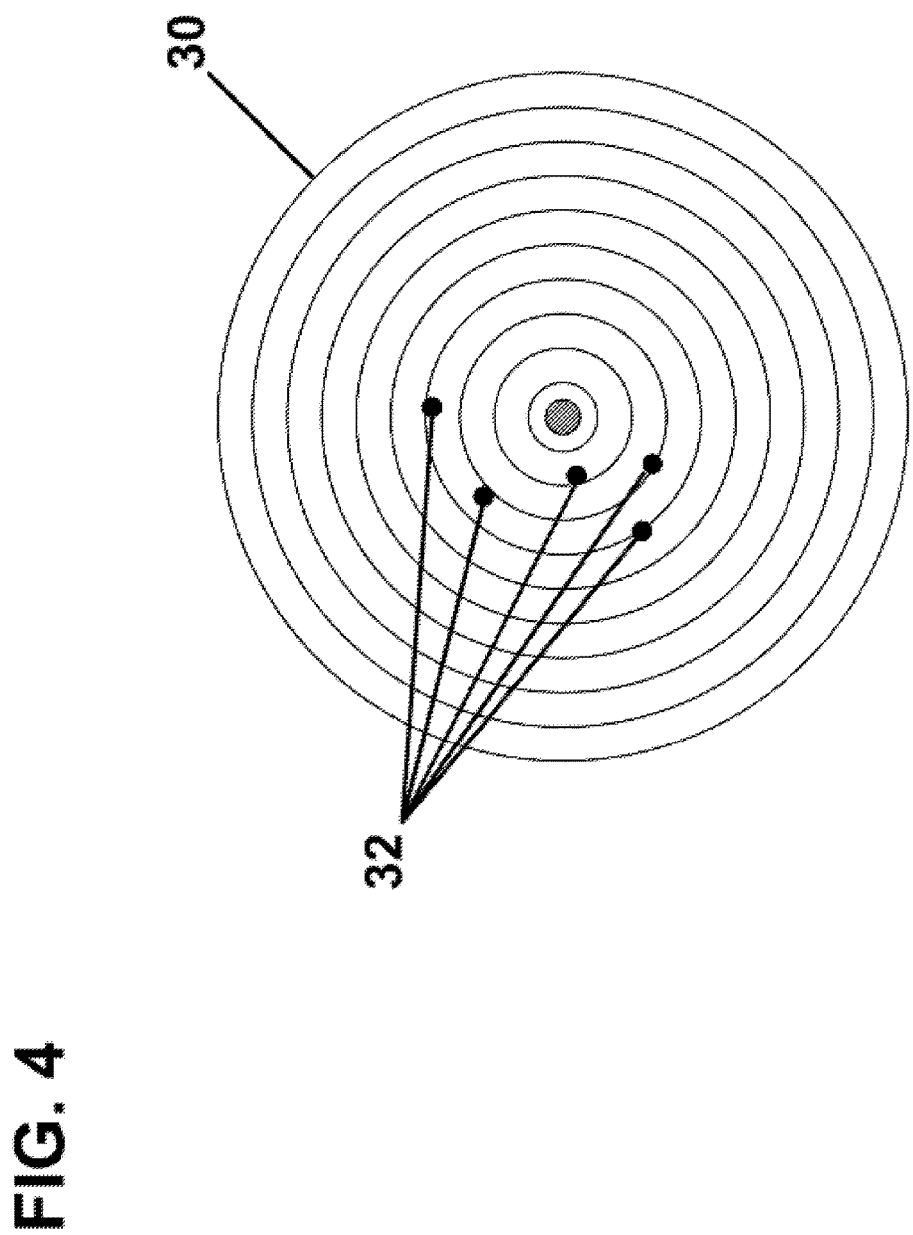
FIG. 4 is an elevation view of a hypothetical target with bullet holes without use of optimized propellant ammunition.

FIG. 4 shows a target 30 with a hypothetical representation of 5 random scattered bullet holes 32 in target groupings of successively fired projectiles where vibration of the muzzle has not been attenuated by an optimum load of propellant.

Figure 5:
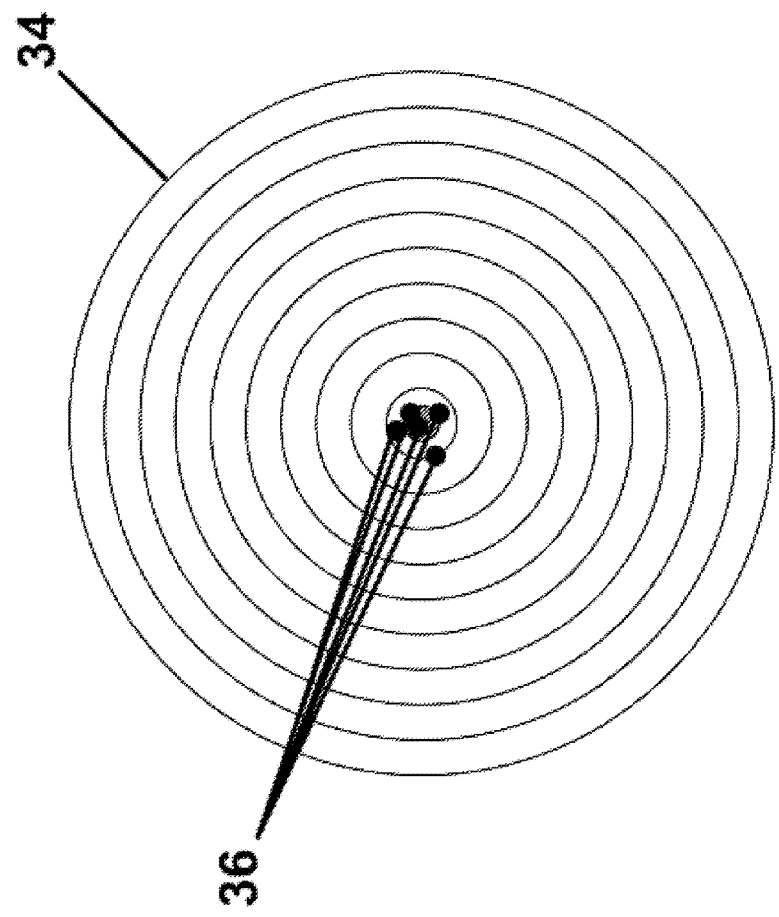
FIG. 5 is an elevation view of a hypothetical target with bullet holes with use of optimized propellant ammunition.

FIG. 5 shows a target 34 with a hypothetical representation of reduced random scattered bullet holes 36 in target groupings of successively fired projectiles where vibration of the muzzle has been attenuated by an optimum load of propellant. Compared to FIG. 4, the accuracy of the projectiles has been improved.

Figure 6:
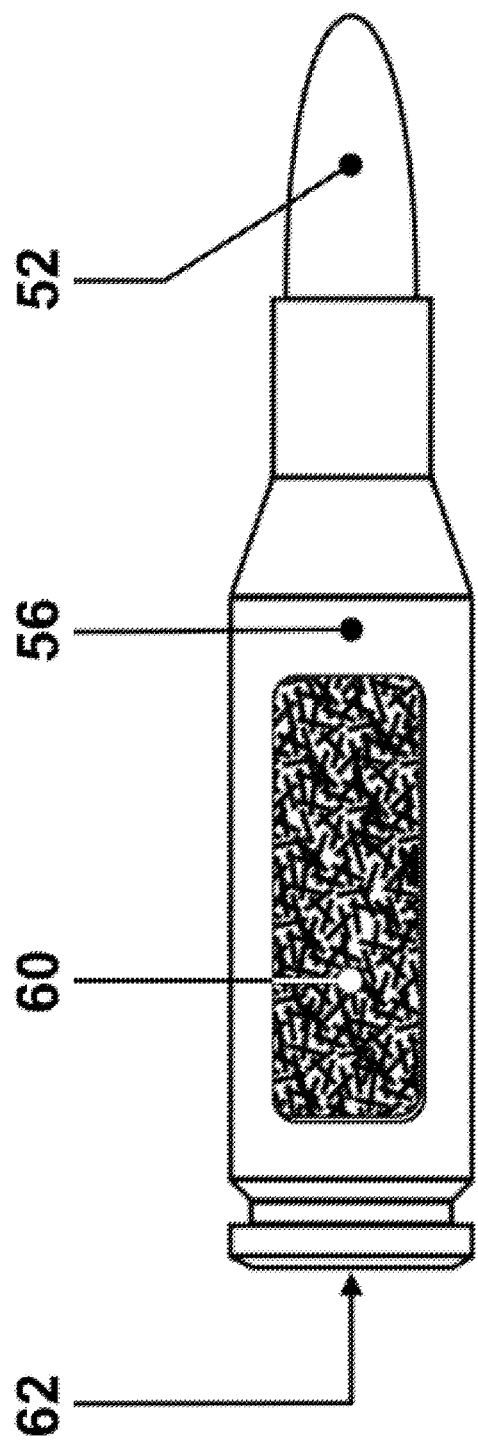
FIG. 6 is a schematic sectional view of a known rifle cartridge.

FIG. 6 illustrates a typical rifle cartridge 50. The cartridge 50 includes a projectile 52, a case 56, propellant 60 within the case and a primer 62 used to ignite the propellant when the rifle fires the cartridge. According to the embodiments of the invention the amount of propellant 60 within the case 56 is adjusted according to different propellant classes.

The present invention provides a method to cost effectively mass-produce and sell a plurality of classes of ammunition where each such class is differentiated by precisely graduated increments of propellant loads, or the formulation of propellant so as to differentiate the specific impulse imparted by a similar volume or weight of propellant such that the acceleration and muzzle velocity of projectiles of the same weight and physical configuration are similarly differentiated by class, but are otherwise highly uniform in all other respects. This present disclosure embodies the practical production, selection, and sale of ammunition that, when fired by a particular, individual, and specific rifle, exhibits significant and substantial improvement in accuracy relative to ammunition manufactured with high precision but with propellant loads not differentiated for use with a particular, individual, and specific rifle.

Table 1 shows exemplary propellant loads for a Winchester 0.308 (7.62 mm NATO) cartridge with the following components: a Sierra 150 grain boat tail spitzer projectile (ballistic coefficient of 0.416 with a sectional density of 0.226); Winchester 748 Smokeless Ball Powder (W748). The example propellant range is from 44.0 grains to 46.9 grains; with First Selection Tier in 0.4 grain increments, followed by Second Tier Increments in 0.1 grain increments. A broader or narrower range can be utilized in First Tier Selection. First Tier selection can also be accomplished in 0.2, 0.3, 0.4, and 0.5 grain increments as necessary to facilitate optimally efficient discovery of the most accurate loads depending on cartridge components, the make and model of rifle, and desired muzzle velocity range within maximum safe load specifications.

TABLE 1

Stock Keeping Load Classes (0.4 grain first tier, 0.1 grain second tier)

| Class Designation | | Increments | |
|---|---|---|---|
| Primary | Subsidiary | 0.4 gr | 0.1 gr |
| 1 | | 44.0 | |
| | b | | 44.1 |
| | c | | 44.2 |
| | d | | 44.3 |
| 2 | | 44.4 | |
| | f | | 44.5 |
| | g | | 44.6 |
| | h | | 44.7 |
| 3 | | 44.8 | |
| | j | | 44.9 |
| | k | | 45.0 |
| | l | | 45.1 |
| 4 | | 46.2 | |
| | n | | 46.3 |
| | o | | 46.4 |
| | p | | 46.5 |
| 5 | | 46.6 | |
| | r | | 46.7 |
| | s | | 46.8 |
| | t | | 46.9 |

Note:
0.1 grains = 0.000229 ounces = 6.48 milligrams

In the alternative to the precise measure of propellant by weight to differentiate between classes of harmonically resonant ammunition, the formulation of propellant so as to differentiate the specific impulse imparted by a similar volume or weight of propellant such that the acceleration and muzzle velocity of projectiles of the same weight and physical configuration are similarly differentiated by class, to achieve the desired improvement in accuracy.

To reduce the total number of test firings necessary to determine the optimal load class, the selection methodology can utilize First Tier test firing to achieve significant improvement in accuracy. Thereafter, refinement utilizing Second Tier increments to determine the absolutely optimal load for a particular rifle can be accomplished.

A user can determine through trial and error, or by use of a test kit, or by utilizing a narrower test range derived from statistical analysis of a field of optimal load data from the same make and model of rifle, that a class 2-f propellant-loaded cartridge is most accurate for the user's rifle. Class 2-f could thereafter be supplied for that rifle with resultant improved accuracy.

The present invention provides a method whereby ammunition optimized for accuracy by means of precisely "timed" or "tuned" ammunition is produced for a particular, individual, and specific rifle's unique barrel harmonics. The present disclosure pertains, and is efficacious, regardless of make, model, variations in manufacture, and configuration of each particular, individual, and specific rifle.

The present invention provides for mass production of a plurality of various classes of ammunition sufficient to produce the desired result of the present disclosure. The purpose of such a plurality of classes is to enable customers to experimentally determine the optimal load of propellant for a particular, individual, and specific rifle or other firearm and thereafter select "off-the-shelf" at retail, in person, online, by mail, or by any other practicable means, the class of product within that type that in particular contains the optimal load for the customer's particular, individual, and specific firearm. The present disclosure also embodies a commercial process that effectively utilizes online sales as a commercial modality where ROI per square foot of retail shelf space is less critical to maintain an inventory of a plurality of classes of otherwise similar product.

By means of the presently disclosed method, customers may avoid the necessity of manual, or otherwise causing the production of, custom ammunition. By this means, customers avoid expending considerable expense and time otherwise necessary to acquire considerable skill, specialized assembly equipment, highly accurate measurement equipment, sufficient workspace, can avoid the storage and use of hazardous component materials, and need not devote the painstaking attention to detail necessary to manually produce unique ammunition for a particular, individual, and specific firearm.

Each specific and precisely graduated class of propellant load or formulation is differentiated by packaging and/or descriptions printed, posted online, or otherwise published as technical material and/or marketing messages, and stocked as separate and distinct stock keeping units ("SKUs").

To effectuate the advantageous utility of a finished product containing the optimal load or formulation of propellant for a customer's particular, individual, and specific rifle, customers may experiment within the range of specific and precisely graduated propellant classes pertaining to a desired caliber and cartridge configuration so as to determine for themselves which of the classes exhibits the best accuracy with their particular, individual, and specific firearm. Thereafter, to maintain optimal accuracy with the particular individual firearm, customers need only select the same packaged product previously determined by them to be optimal, unless and until the firearm is materially modified. Manufacturers of firearms may also pre-classify each of the rifles they produce, marking the rifle, its packaging, or providing other messages, so that customers may avoid the necessity of experimentation within the range of specific and precisely graduated propellant classes to determine for themselves which of the classes exhibits the best accuracy with a particular, individual, and specific firearm.

In the event of a material change or modification of the firearm affecting barrel harmonics, such as the addition of a scope, alternate stocks, a vibration dampener, a flash suppressor or flash guard, or other equipment, customers may again experiment within the range of specific and precisely graduated propellant classes pertaining to a desired caliber and cartridge configuration to determine which of the classes exhibits the best accuracy with their particular, individual, and specific firearm. Thereafter, to maintain optimal accuracy with the particular, individual, and specific firearm, customers need only select the same packaged product previously determined to be optimal unless and until the firearm is again materially modified.

Barrel harmonics constitute temporally evolving vibrations, comprised of a complex compound waveform containing a multiplicity of harmonic frequencies, wave amplitudes, and reverberations in both compound pressure waves and transverse waves throughout the length of a rifle barrel and pronounced at the muzzle of the barrel. These vibrations, while exhibiting evolving cumulative amplitudes comprised of numerous harmonics, are consistently repeated each time a particular individual rifle is fired using uniformly identical ammunition, provided that the barrel and other fixtures are firmly seated.

By means of sequential, specific, and precisely graduated changes of the propellant load, or propellant formulations, the acceleration of a projectile is modified so as to change the interval between the firing of the cartridge's primer and the exit of the projectile from the barrel, enabling synchronization of the arrival at the barrel's muzzle of harmonically attenuated vibration with the arrival of the projectile. When the amplitude of such vibration is reduced, the stability and trajectory of a projectile concurrently exiting the muzzle is least perturbed or deflected, thereby significantly improving accuracy as evidenced by significant and substantial reduction of random scatter in target groupings of successively fired projectiles.

Multiple "windows" of harmonically attenuated vibration occur during the period between the detonation of ammunition primer and exit of the projectile from the muzzle. However, the specific timing of the arrival of each incident of reduced vibration at the muzzle of a particular individual rifle is dependent on a particular individual rifle's specific and unique barrel harmonics, including modification of the waveform resulting from the characteristics of the specific ammunition propellant charge. The attack, sustain, and decay of each rifle's harmonic waveform is modified by the propellant load or formulation and projectile attributes of each specific and precisely graduated class within each type of ammunition. Thus, precise prediction of the formulation of each rifle's barrel harmonics is problematic. Other than general statistical predictions, only after a rifle has been fully assembled and configured for field use can a propellant load be determined to optimally "time" the arrival of a projectile coincident with the temporal arrival of an incident of suitably attenuated vibration. As each load is modified with experimentation, windows of reduced vibration can be seen to be approached, and ultimately safely exploited, thereby causing random scatter in target groupings of successively fired projectiles to be observably, significantly, and substantially reduced. Although an optimal class of propellant load or formulation, sufficient to produce the desired results of the present disclosure, cannot be reliably determined without direct experimentation with the particular, individual, and specific firearm, the present invention also incorporates the production or designation of experimental kits with which an optimal class of ammunition can be determined using a significantly reduced set of classes of ammunition by means of the elimination of statistically outlying increments of propellant load or formulation that would otherwise be required to ascertain an optimally accurate propellant load. The basis of statistical prediction of a narrower subset of test classes is a derivation of the harmonic vibrations resulting from highly similar physical characteristics of different firearms of the same make and model; and can incorporate common attachments. These characteristics include, but are not limited to similarities in: the length, thickness, and taper of barrels; the shape, density, and elasticity of stocks; magazine configuration; and receiver assemblies structures between multiple copies of the same make and model of rifle; as well as the addition of the most common scopes and other optional equipment.

To effectuate optimal accuracy of any firearm, regardless of ammunition load, the barrel and all other assemblies and masses are firmly seated and attached. This is so that the barrel harmonic waveforms can be reliably replicated each time a cartridge is fired.

While precisely optimal "timing" of propellant can reduce random scatter in target groupings of successively fired projectiles from a particular, individual, and specific rifle to less than ten arc seconds of variation, because the attenuation of harmonic vibration increases as an absolutely optimal propellant load is approached, significant and substantial improvement in accuracy can be achieved while limiting the absolute variety of propellant loads to a practical subset of the total possible variety of graduations differentiating each classes for each caliber and cartridge configuration of ammunition.

Production Methodology

Utilizing industrial high-precision mass-production manufacturing techniques to produce functionally identical highly uniform ammunition, the subject invention is realized in the production of specific and precisely graduated increments of propellant loads, or in the formulation of propellant so as to differentiate the specific impulse imparted by a similar volume or weight of propellant in ammunition cartridges that are otherwise highly uniform and functionally identical.

The present disclosure's utility is realized by achieving a reasonable balance between the most accuracy technically possible by means of the disclosed technique, and the cost effective production, inventory maintenance, and sale of a reasonably limited variety of propellant load classes necessary to achieve significant and substantial improvement in the accuracy of a customer's rifle. The economy of scale of manufacture and sale of such classes of propellant loads can thereby be obtained. Assembly, maintenance, and packaging of a sufficient variety of stock keeping units ("SKUs") in quantities sufficient to meet sales demand and customer expectations, that also strikes a reasonable balance such that produced ammunition is substantially and significantly more accurate than uniform ammunition, is the practical result of the present invention.

To achieve the cost effective mass production of "timed" or "tuned" harmonically resonant ammunition, each of the different classes of precisely graduated loads of propellant can be portioned by weight. This is best accomplished by means of an automated process whereby, prior to insertion into cartridge cases during an automated cartridge assembly process, each propellant load is accurately weighed and incrementally adjusted as necessary to assure the highest practical precision. In the alternative, the specific impulse of propellant utilized in each class can be of precise weight such that the acceleration of projectiles of each class are predictably differentiated. In both former and later methods, the calibration of precise measures and the portioning process should be performed at a rate equal to the optimal assembly rate of high-speed automated cartridge assembly systems. An advantageous method and apparatus for loading ammunition casings with propellant is described in U.S. application Ser. No. 14/464,405, filed on Aug. 20, 2014, now U.S. Pat. No. 5,400,6418, issued Mar. 21, 2017, herein incorporated by reference.

While this method of manufacture is susceptible of embodiment in many different forms, there are shown in the drawings, and will be described herein in detail, specific embodiments thereof with the understanding that the present disclosure is to be considered as an exemplification of the principles of the invention and is not intended to limit the invention to the specific embodiments illustrated.

An exemplary embodiment of the invention shown in FIGS. 7-24 operates as follows.

Granular material 110 is retained by a granule source hopper 112 that releases small quantities of free flowing granular material so as to limit the weight of material bearing down on the volumetric metering system or volumetric assembly 114. A photo sensor 116 detects when the small portion of granules being fed into a chamber 118 of the volumetric assembly 114 requires replenishment. Granular material from the small portion of granules is fed by gravity into the volumetric assembly 114 comprised of a multiplicity of spring-loaded telescoping chambers 118, the compression of which, and thereby the interior volume of which, may be modified as needed by a gear mechanism 126 (FIG. 15) and stepper motor assembly 128 under the control of a computer. The material 110 is then acted on by a screed 132 on a screed plate 133. The screed includes a flexible steel and rubber mesh immediately followed by a round or angular surface to remove excess material from the top of the telescoping chamber 118 without slicing or crushing the granules as they are isolated in the chamber. The resulting volumetrically measured portion of the subject material is transferred to a container of a granule cup assembly 136 as the volumetric assembly 114 rotates under the control of a further gear mechanism 144 and stepper motor 148 assembly under the control of the computer (FIG. 16). The granule cup assembly 136 is itself located in a position on a rotational plate or platform 150 holding a plurality of additional granule cup assemblies 136. As the rotational platform 150 rotates, it delivers the subject granule cup assembly 136 containing the granular portion to a scale 156. The granule cup assembly 136 is installed on the rotational platform 150 such that it rests through a hole in the rotational platform and is able to move vertically without obstruction, held axially in position by two positioning pins 160 that also pass through the rotational platform 150. When the granule cup assembly 136 is positioned in the center of the scale 156, the rotational platform rotates minutely backward so that the granule cup assembly 136 and positioning pins 160 are free standing on the scale 156 with preferably no point whatsoever in contact with the rotational platform 150; thus eliminating any possible friction between the rotational platform 150 and the granule cup assembly 136 that might otherwise adversely affect the accuracy of weight measurement. The granule cup assembly 136 and subject material portion 110 are then weighed to determine, less the weight of the container, an exact weight measurement of the subject material 110.

If the material 110 is overweight, the computer causes the retention of the material as the rotational platform 150, under computer control, causes the granule cup assembly 136 to pass over other stations until the subject granule cup assembly is positioned where the overweight portion may be dumped. Preferably, the granule cup assembly 136 is emptied of all granules during the dump. The subject material is dumped into a chute 166 that directs the material 110 into a container 170 for rejected granule portions so that the material 110 may be reprocessed. Simultaneously, the computer causes the interior volumes of the volumetric assembly's 114 volumetric measurement chambers 118 to be automatically incrementally reduced, thus reducing the weight of subsequent granule portions.

If the weight of the subject portion 110 is more than a small number of granules underweight, the computer causes the retention of the material as the rotational platform 150, under computer control, causes the granule cup assembly 136 to pass over other stations until the subject granule cup assembly 136 is positioned where the underweight portion may be dumped. Preferably, the granule cup assembly 136 is emptied of all granules during the dump. The subject material 110 is dumped into a chute that directs the material into a container for rejected granule portions so that the material may be reprocessed. Simultaneously, the computer causes the interior volumes of the volumetric assembly's 114 volumetric measurement chambers 118 to be automatically incrementally increased, thus increasing the weight of subsequent granule portions.

When the weight of the subject volumetric measure is equal to or slightly less than, but never over, the target weight specification, the automatic volumetric calibration is complete. However, automatic volumetric calibration is reinitiated whenever this said condition is no longer valid.

With the subject granule cup assembly 136 is in position on the scale 156, a granule meter assembly 180 that can be computer controlled, adds a small number of additional individual granules 110 until the target weight of the portion is achieved to within the weight of an individual granule 110. Any error causing an overweight portion in this instance does not initiate volumetric calibration, but the computer causes the retention of the material as the rotational platform, under computer control, rotates the granule cup assembly 136 to pass it over other stations until the subject granule cup assembly 136 is positioned where the overweight portion may be dumped. Preferably, the granule cup assembly 136 is emptied of all granules during the dump. The subject material is dumped into the chute 166 that directs the material into the container 170 for rejected granule portions so that the material may be reprocessed.

When a weighed portion of granules meets the target weight specification, the computer causes the rotational platform 150 to move the subject granule cup assembly 136 to where the portion may be delivered by means of a chute 188 to a granule consolidation assembly 192 to time the release of the portion for further processing depending on the intended application of the subject material. Preferably, the granule cup assembly 136 is emptied of all granules during the delivery to the chute 188.

The operation of the granule meter assembly 180 is as follows: granular material is retained by a second granule source hopper 196 that releases small quantities of free flowing granular material 110 so as to limit the weight of material bearing down into the internal working of the granule meter assembly 180; a horizontal conveyor 1106 limits the flow and regulates the feed rate of granular material 110 into the assembly 180; a narrow inclined conveyor 1110 with compartments, cups, indentations, or depressions 1116 such that only one granule of the type being processed may be situated within a compartment 1116 at one time and moves and isolates individual granules in preparation for release from the assembly; a gear mechanism 1122 drives the action of both conveyors 1106, 1110 where the horizontal conveyor 1106 is slower than the inclined conveyor 1110; a computer controlled stepper motor 1128 drives the gear mechanism 1122; a V-shaped trough 1134 directs the flow of granules 110 onto the inclined conveyor 1110 when they fall from the horizontal conveyor 1106; an electric motor 1140 with an off-axis weight, or a transducer, vibrates the V-shaped trough 1134; a brush 1144 prohibits back spilling granules 110 as they are fed to the V-shaped trough 1134 from the horizontal conveyor 1106; a brush 1148 at the apex 1152 of the inclined conveyor 1110 clears granules 110 not properly seated within a compartment 1116 of the inclined conveyor 1110; a photo sensor 1160 at the apex 1152 of the inclined conveyor 1110 verifies the presence of an individual granule 110; a chute 1166 directs individual granules 110 as they fall from the end of the inclined conveyor 1110 to an exit port 1288 of the granule meter assembly 180; a photo sensor 1176 at the exit port 1288 of the granule meter assembly 180 verifies the release of an individual granule 110; and a computer controlled solenoid 1182 closes an exit port hatch 1172 of the granule meter assembly whenever a granule cup assembly 136 is not at rest in position on the scale.

Figure 7:
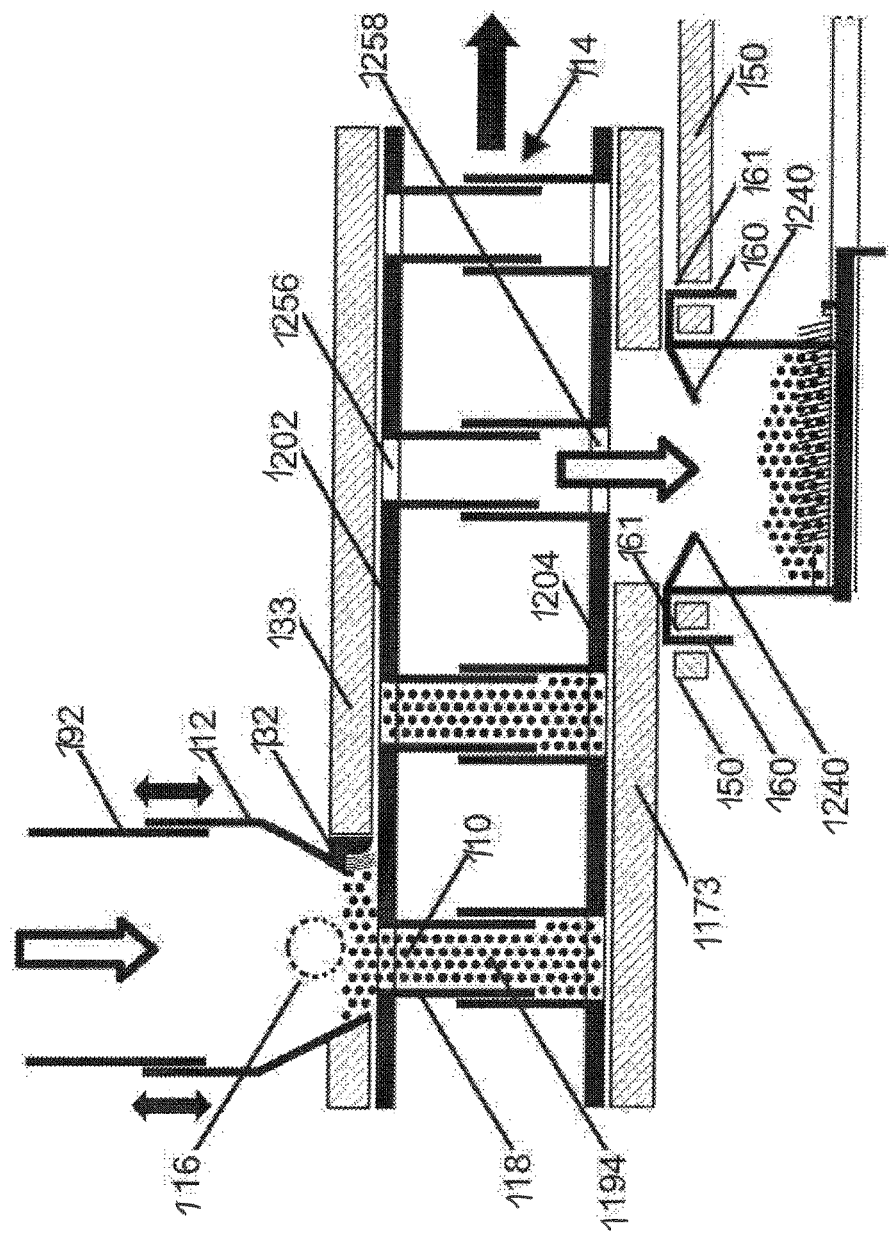
FIG. 7 is a schematic, sectional diagram of a volumetric portioning part of an apparatus according to the invention.

FIG. 7 is a diagram showing the granule metering process whereby the interior volume of a telescoping cylinder 118 controls the volume of granules to be weighed. Also indicated is a cross section of a portion of a rotational platform containing a granule cup assembly 136 into which metered granules are deposited.

FIG. 7 shows the granule feed hopper 112. FIG. 7 shows the photo sensor 116 that triggers the computer controlled release of granules from the granule source hopper 112 when the chamber 118 is low. Granules 110 are gravity fed into the granule feed hopper 112 in small quantities to reduce pressure as granules 110 are fed into the volumetric chamber 118. The screed 132 then divides feed source granules 110 from the granules 110 that have been portioned in a chamber 118 of the volumetric assembly 114 as the chamber moves relative to a Base Plate 1173 and the Screed Plate 133. FIG. 7 shows the side view of a flexible steel and rubber mesh embedded into the screed 132 of the volumetric assembly 114. The flexible steel and rubber mesh, together with a rounded or angular leading edge, pushes granules as the volumetric assembly is rotated relative to and between the screed plate 133 and the base plate 1173 while avoiding slicing or crushing granules of any shape as the screed 132 divides an initial volumetric measurement of granules from the feed source. FIG. 7 shows a detachable feed tube 1190 that carries granules from a hopper meter (FIG. 20) to the hopper 112.

The metered volume of granules is variable as required to most closely yield the target weight 1194 of granules, equal to or less than the target weight parameter, as measured by the scale 156. This is accomplish as the screed plate 133 is moved vertically relative to the base plate 1173 which changes the relative vertical position of the top and bottom chamber plates 1202, 1204 of the volumetric assembly 114. The vertical position of the screed plate 133 is automatically adjusted by means of computer control of a stepper motor 128 and gear configuration 126; an example of which configuration is provided in FIGS. 16-18. The top chamber plate 1202 is separated from the screed plate 132 by means of a bearing ring (not shown) which maintains the relative vertical position of each plate 1202, 133 while permitting the top chamber plate 1202 to rotate in unison with the bottom chamber plate 1204. The bottom chamber plate 1204 is separated from the Base Plate 1173 by means of a bearing ring (not shown) which maintains the relative vertical position of each plate 1173, 1204 while permitting the bottom plate 1204 to rotate under computer control of a gear mechanism 1230, and stepper motor assembly 1234 (FIG. 16).

When a granule filled chamber 118 moves into position, the granules 110 drop, through a slosh ring 1240, which is a part of each granule cup assembly 136, that inhibits the loss of any granules as the granule cup assembly 136 is rotated rapidly, and which sits on a rotational platform 150 that transports one or more granule cup assemblies 136. Preferably, the chamber 118 is emptied of all granules during the drop. The orientation of the granule cup assembly 136 is maintained by the positioning pins 160 that guide each granule cup assembly to freely move vertically as needed in the next process. Two or more pins 160 are provided which protrude through respective holes 161 through the plate 150.

FIGS. 8 and 8A are three dimensional drawings showing the relationship of the top and bottom portion of a rotational volume assembly that enables variable volumetric measurement of granules as in FIG. 7. The components are also shown in an assembled position (FIG. 8A).

The top and bottom plates 1202, 1204 incorporate top and bottom nesting or telescoping chamber tubes 1250, 1254. Openings 1251, 1252 in the chamber tubes 1250, 1254 permit the tubes to nest, thus providing a variable interior volume with variation in the proximity of the top and bottom plates 1202, 1204. Apertures 1256, 1258 through the top and bottom plates permit granules to enter each of the chambers 118 from above, and exit from below.

Figure 9:
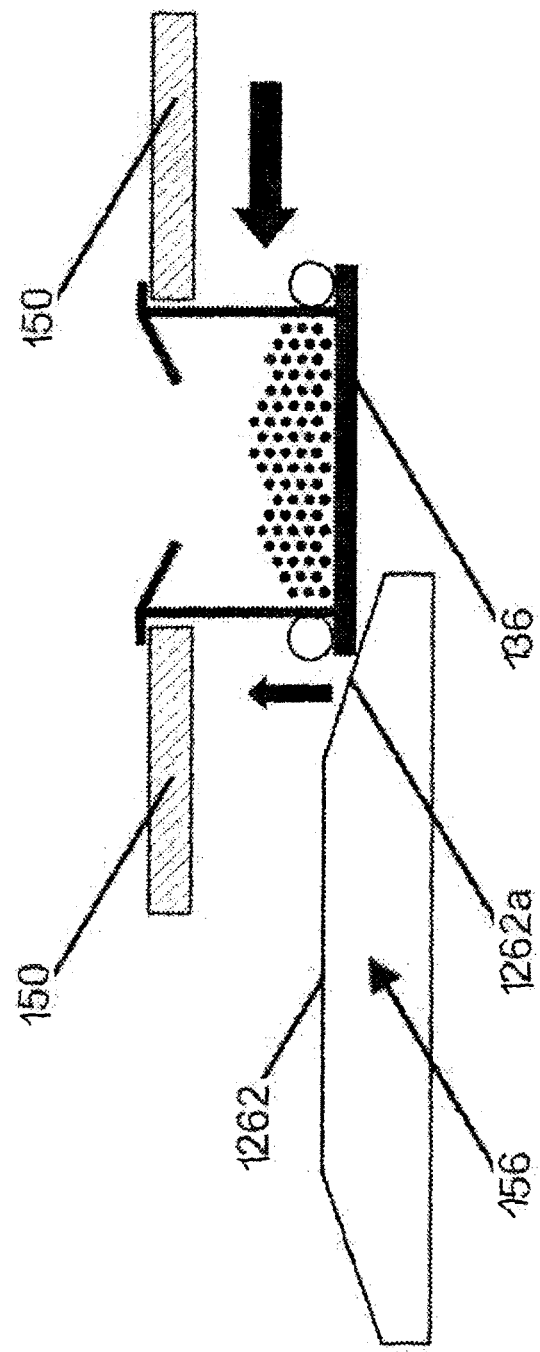
FIG. 9 is a schematic, sectional diagram of a weighing apparatus for a portion of the an apparatus according to the invention.

FIG. 9 is a diagram of a section of the rotational platform with a granule cup assembly 136 containing a metered portion of granules deposited by the volumetric measurement process of FIG. 7 as it encounters a scale platform so that the specific weight of the portion of granular aggregate may be measured.

FIG. 9 shows a section of the rotational platform 150 with a granule cup assembly 136 being moved into position for weight measurement. A replaceable steel platform cover 1262 is depicted that fits on the top of the scale 156 with an incline leading edge 1262a that lifts the granule cup assembly 136 permitting it to be centered on the scale 156 to be weighed thereby. As the platform cover 1262 wears from continuous use it can be easily replaced as can worn granule cup assemblies 136.

Figure 10:
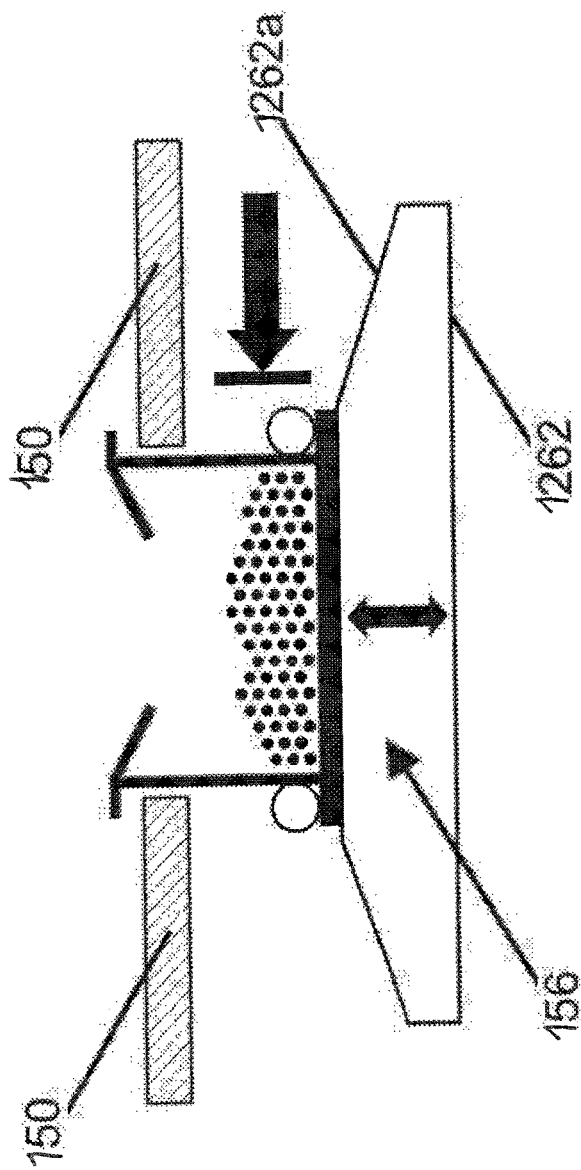
FIG. 10 is a schematic, sectional diagram of the weighing apparatus of FIG. 9 in a further stage of operation.

FIG. 10 is a diagram showing a granule cup assembly sitting on the scale as the rotational platform 150 is halted and the granule cup assembly 136 is able to freely rise and fall in relation to the rotational platform as its weight is measured by the scale 156.

FIG. 10 shows the granule cup assembly 136 containing a portion of granules being weighed. The granule cup assembly 136 can freely move vertically so that the weight of the assembly together with the portion of granules can be sampled. The total weight, less the weight of the granule cup assembly 136, yields the weight of the portion of granules.

Figure 11:
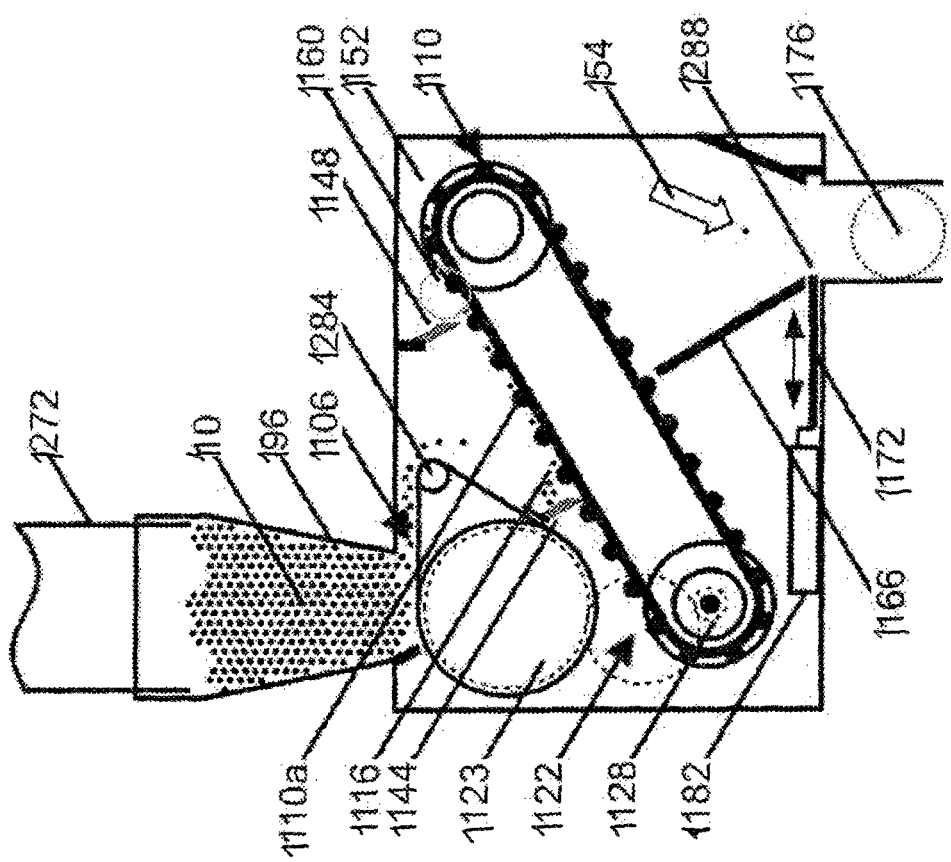
FIG. 11 is a schematic, sectional view of a weight portioning part of the apparatus according to the invention.

FIG. 11 is a diagram showing a granule meter assembly that can release individual granules, as needed, so that the weight of each granule cup assembly with the granular aggregate matches the target specification while the granule cup assembly is on the scale depicted in FIG. 10.

FIG. 11 shows a simplified side view of a granule meter assembly 180, a device that isolates and releases individual granules 110 to a waiting granule cup assembly 136 as it is being weighed as in FIG. 10. Granules may be added until the precise target weight specification is achieved. Granules are fed to the apparatus by means of a tube 1272 and retained in the small hopper 196. The horizontal conveyor 1106 drops small quantities of granules into a V-shaped inclined trough 1134 (FIG. 12) vibrated by an electric motor 1140 with an off-axis weight, or a transducer, so that an inclined conveyor 1110 can capture individual granules 110. The V-shaped inclined trough 1134 is vibrated by the electric motor 1140 (FIG. 12) with an off-axis weight, or a transducer, to assist the movement of individual granules 110 onto the inclined conveyor 1110. The surface 1110a of the inclined conveyor 1110 has nubs 1116 sized and spaced to accommodate no more than one individual granule of the approximate shape and size being processed. A brush 1141 prohibits granules from falling backward as the conveyor enters the V-shaped trough. A brush 1148 near the apex 1152 of the inclined trough 1110 prohibits the release of more than one individual granule at a time. A photo detector 1160 confirms the presence of each granule at the apex of the inclined conveyor 1110. When each individual granule 110 is released (see arrow 154), the photo detector 1176 confirms the release. A gate 1172 is open during release, but closed during the movement of granule cup assemblies 136, actuated by a computer controlled solenoid 1182. The inclined conveyor 1110 is actuated by a stepper motor 1128. A gear mechanism 1122 advances the horizontal conveyor 1106 via a gear mechanism 1123 at a slower rate than the inclined conveyor 1110 so that granules are not accumulated as they are fed to the inclined conveyor.

Figure 12:
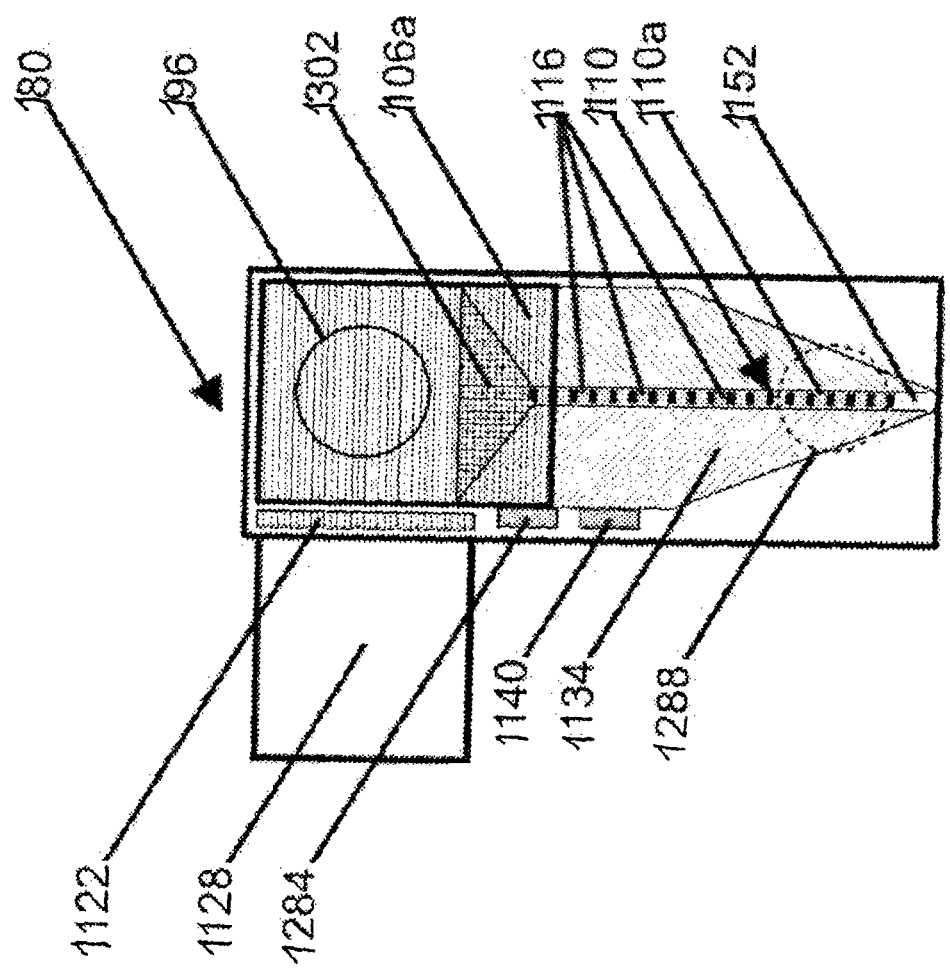
FIG. 12 is a plan view of the apparatus part shown in FIG. 11.

FIG. 12 shows a simplified top view of a granule meter assembly 180. The top of the gear mechanism 1122 advances the horizontal conveyor 1106. The stepper motor 1128 that drives both the horizontal and inclined conveyors is shown. The horizontal conveyor's 1106 unpowered roller 1284 positions granules for their fall into the V-shaped trough 1134. FIG. 12 shows the position of the outlet aperture 1288 for individual granules as they exit the granule meter assembly. The granule hopper 196 is the inlet for granules for processing by the granule meter assembly 180. A V-shapes panel 1302, beneath the horizontal conveyor 1106 at the feed end of the V-shaped trough 1134 confines granules and directs them onto the inclined conveyor 1110. A relative position of the top surface 1106a of the horizontal conveyor 1106 is shown. A top surface 1110a of the inclined conveyor 1110 isolates and transports individual granules 110 (granules not shown) to the apex 1152 of the conveyor 1110 where individual granules are released.

Figure 13:
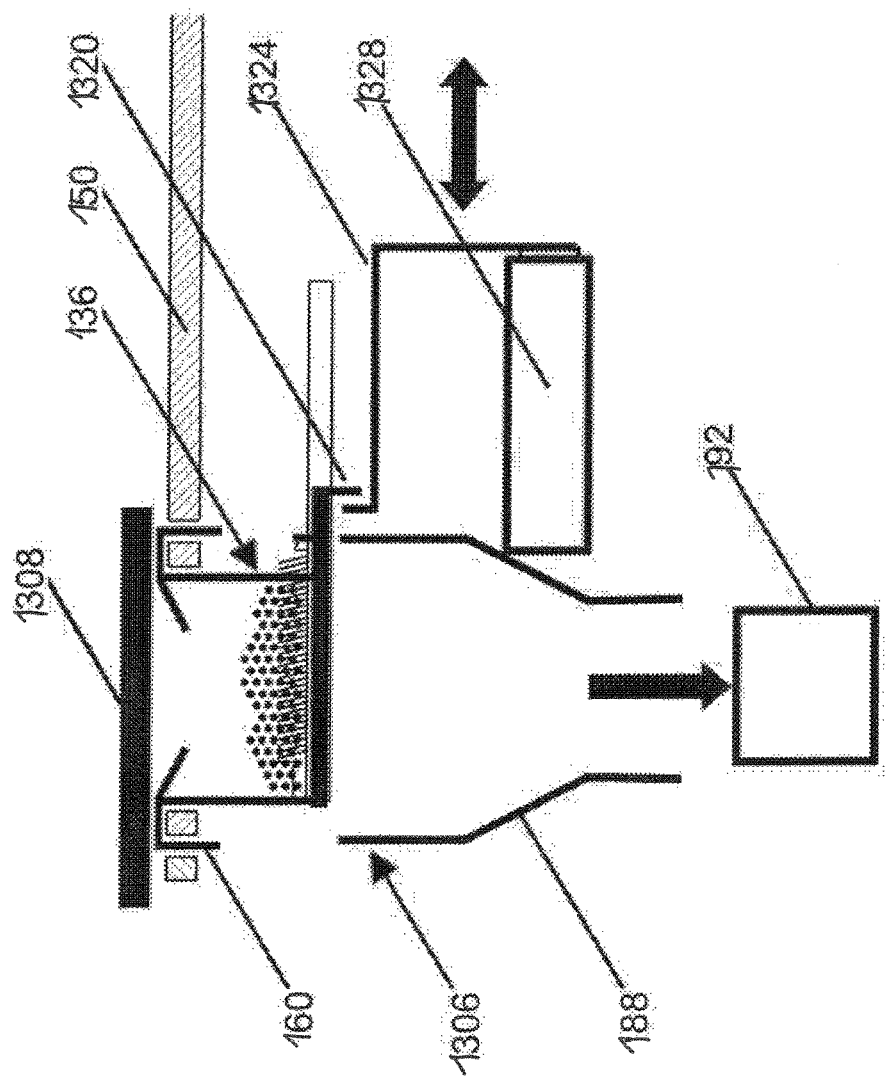
FIG. 13 is a schematic, sectional diagram of a dispensing part of the apparatus according to the invention.

FIG. 13 is a diagram showing the next station as the rotational platform delivers the granule cup assembly for release of granules into a chute.

Figure 21:
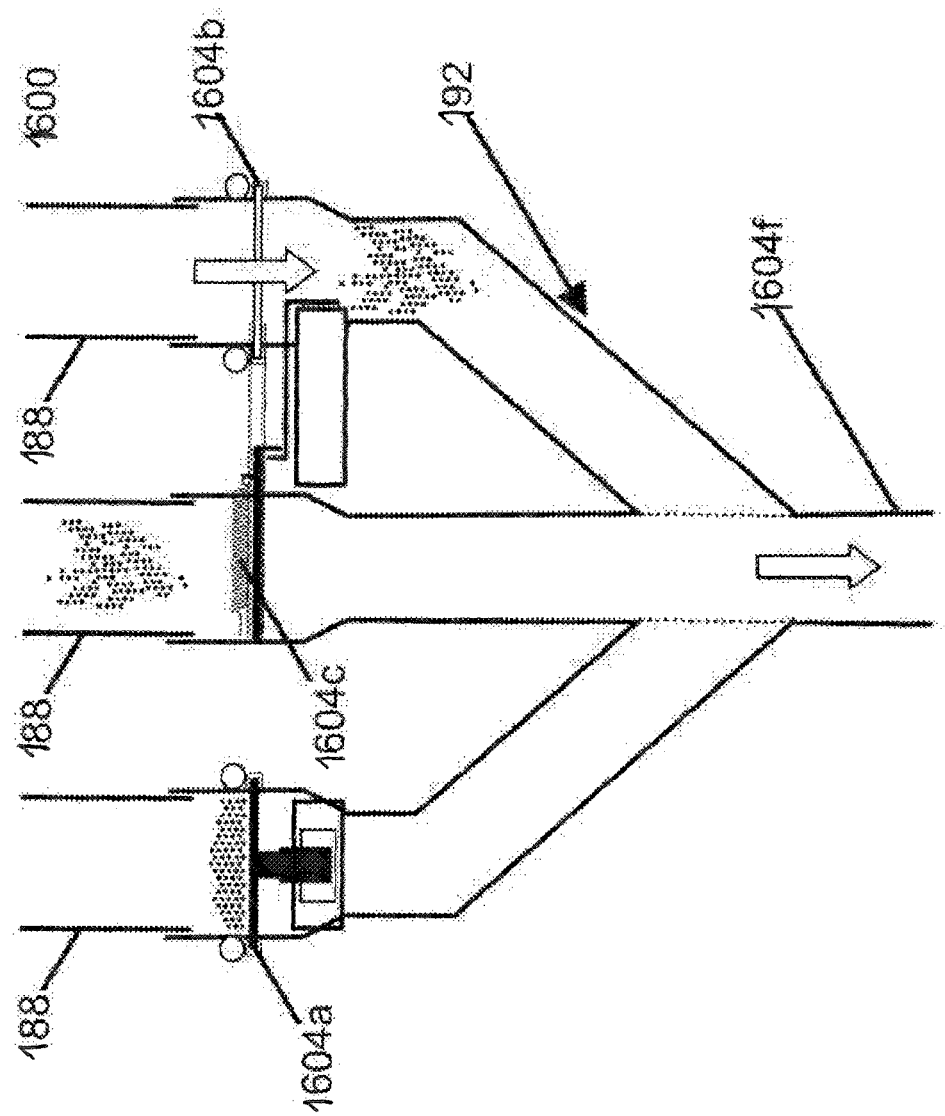
FIG. 21 is a schematic, sectional view of a granule consolidation assembly to be fed by the apparatus of FIG. 18.
Figure 22:
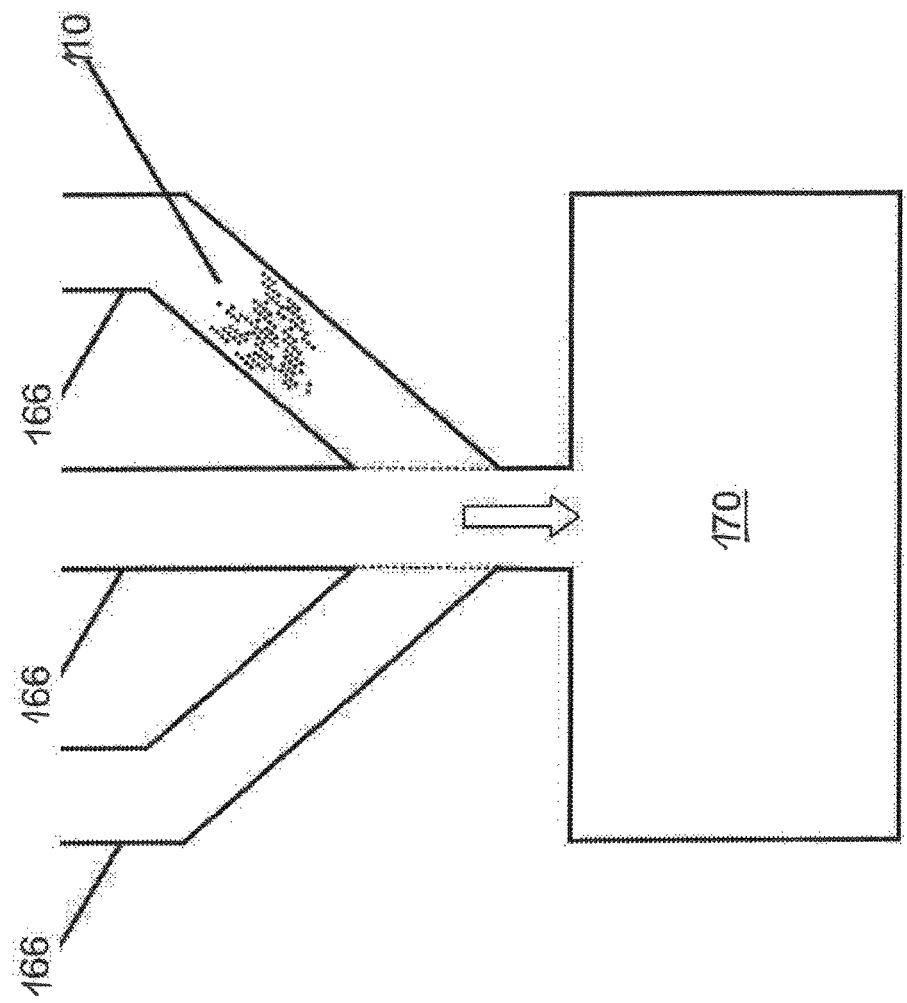
FIG. 22 is a schematic, sectional view of a tube consolidation and reject container to be fed by the apparatus of FIG. 18.

FIG. 13 shows one of two granule cup assembly release stations 1306. A granule cup assembly 136 is first positioned by the rotational platform 150 over the fall chute 188 in preparation for release of the granules to the granule consolidation assembly 192 (FIG. 21). At this release station 1306, only if the target weight of the granule aggregate is correct will the granules be released. If the initial volumetric measure exceeds the precise target weight specification, the granules will not be released. Instead, the granular aggregate will proceed to the next identical station where they will be released and accumulated in the overweight container 170 (FIG. 22). In each case, as a granule cup assembly 136 is positioned, a cover 1308 stabilizes the granule cup assembly's vertical position for release. The granule cup assembly's release tab 1320 is positioned so that the release arm 1324 can engage the tab 1320. A solenoid actuator 1328 is shown in its idle position.

Figure 14:
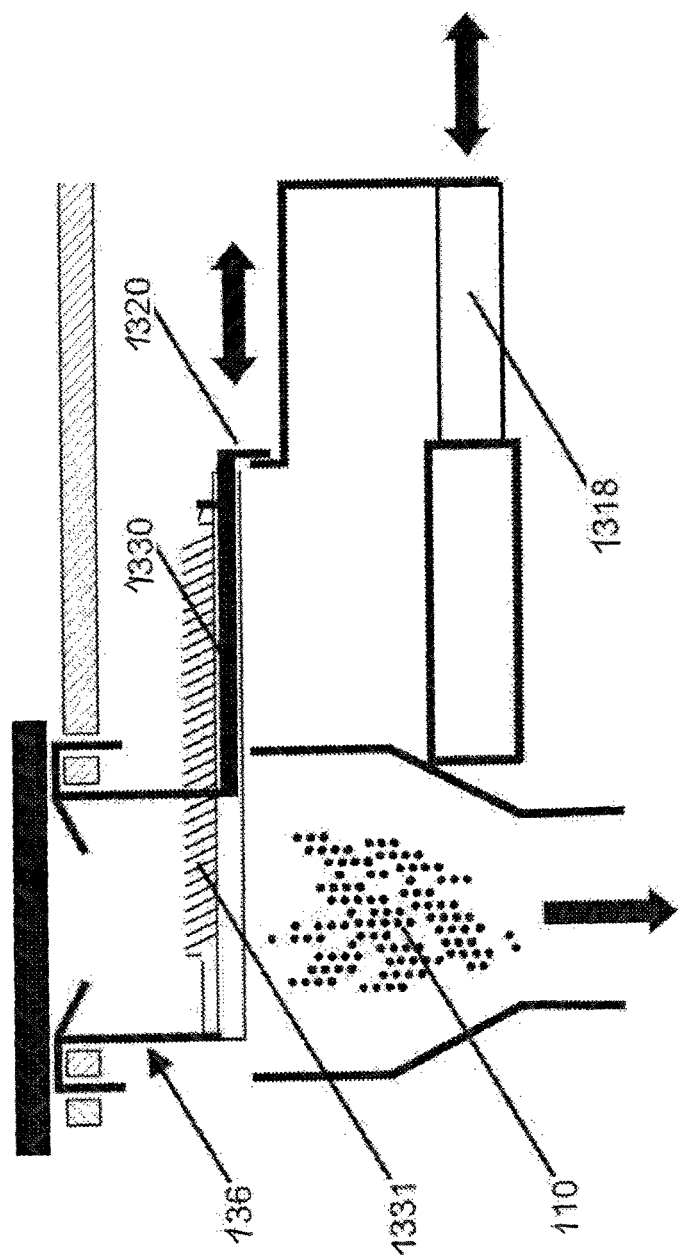
FIG. 14 is a schematic, sectional diagram of the dispensing part of FIG. 13 in a further stage of operation.

FIG. 14 is a diagram showing the release of the granular aggregate into the chute as a solenoid is actuated.

FIG. 14 shows the granule cup assembly 136 releasing its load with its spring loaded hatch 1330, pulled toward closed by the spring 1331, drawn open by the action of the solenoid 1328 acting on the tab 1320.

Figure 15:
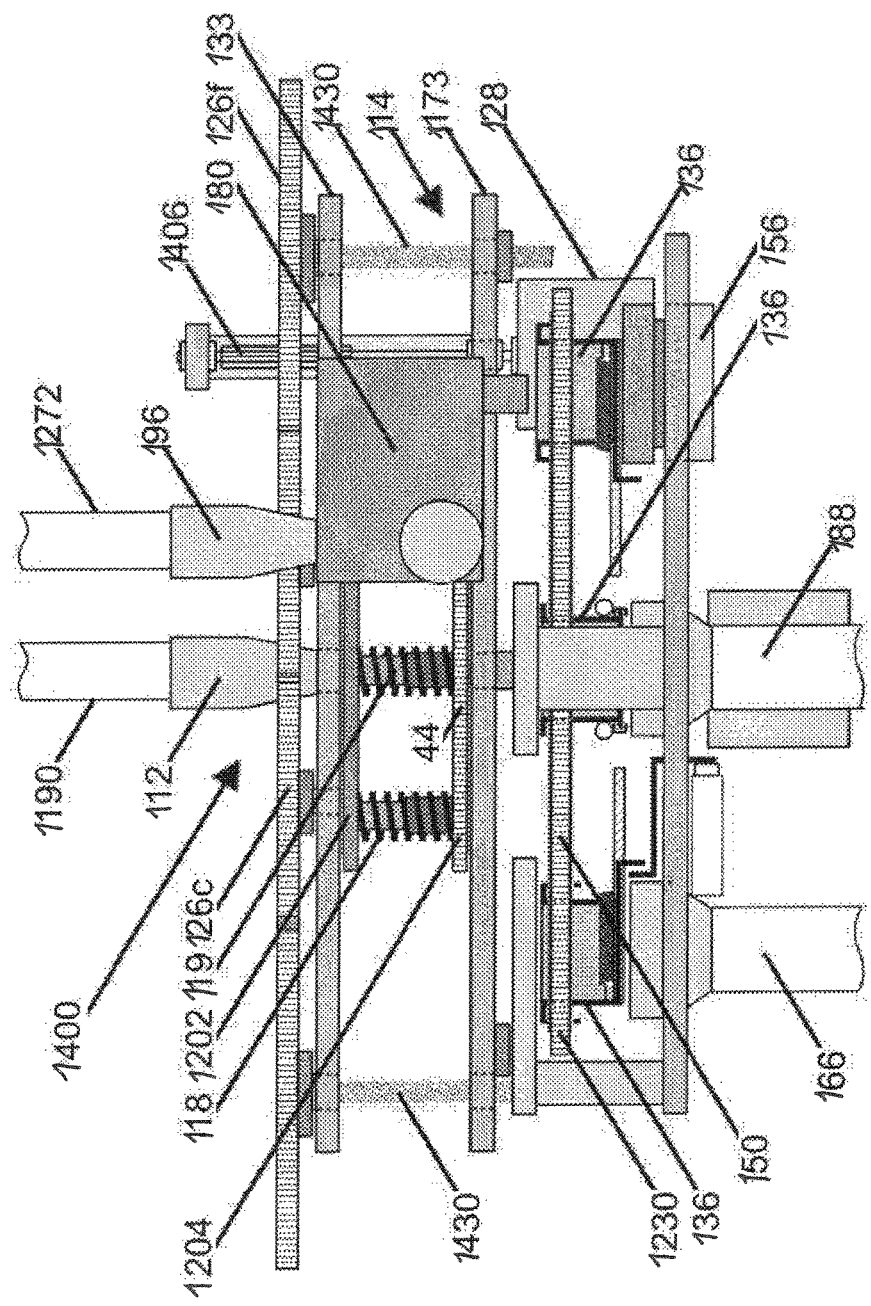
FIG. 15 is a front view of the apparatus according to the invention.
Figure 16:
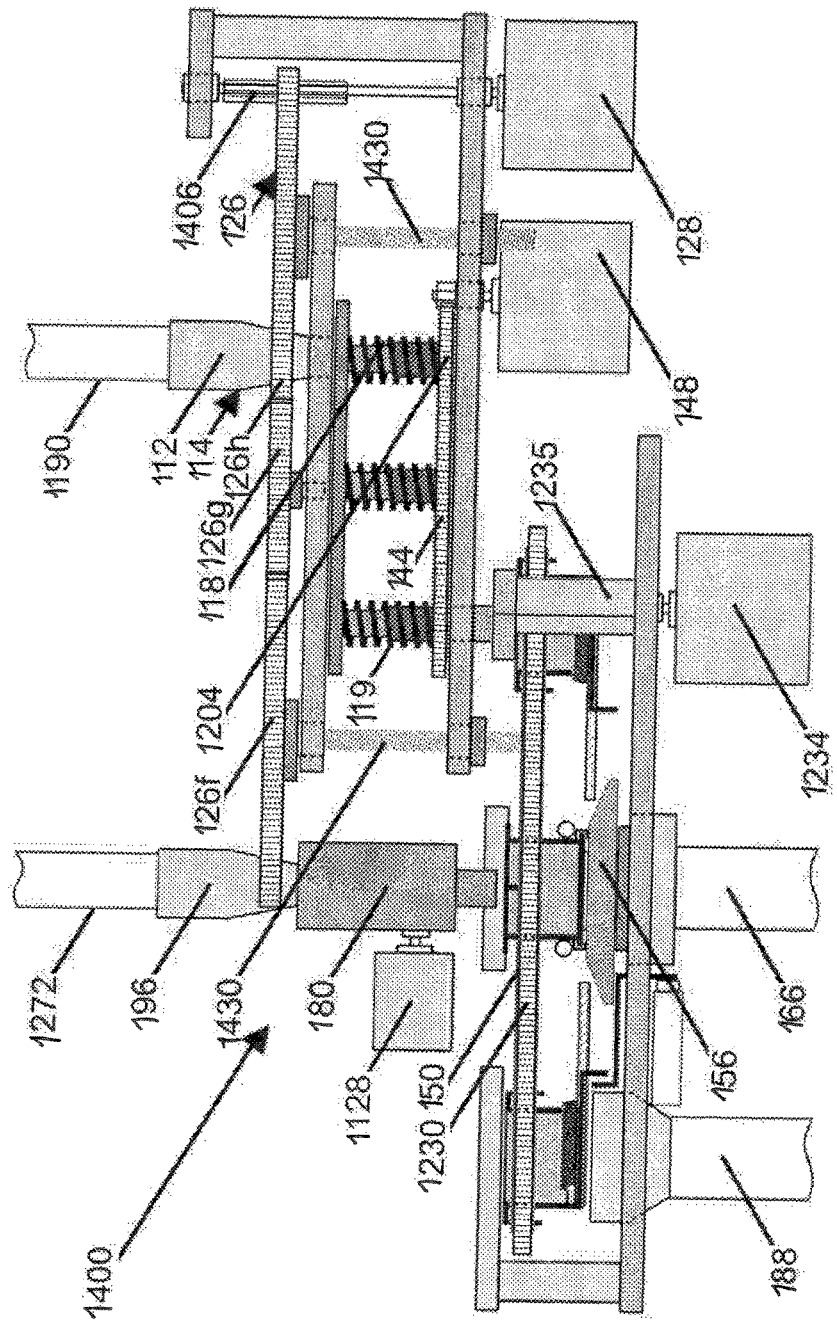
FIG. 16 is a side view of the apparatus of FIG. 15.

FIG. 15 is a drawing showing a front view of one complete modular assembly 1400 including the location of the drive gear 1406 for the spring loaded chamber tubes 118 sandwiched between the screed plate 133 and the base plate 1173 of the volumetric assembly 114. Each tube 118 is surrounded by a coil spring 119, which is compressed as the plate 133 is adjusted to approach the plate 1173. The chamber tubes 118 may also be advanced using a central shaft directly connected to a stepper motor or solenoid ratchet mechanism. FIG. 15 depicts the side of the gear mechanism 1410 that compresses the spring loaded chamber tubes 118 of the volumetric assembly 114 causing the chamber tube assembly to telescope, uniformly expanding or reducing the interior volume of each chamber 118, thereby expanding or reducing the volume of initially portioned material as needed. FIG. 15 shows the granule source inlet 1190 to the Volumetric Assembly. FIG. 15 depicts the granule hopper 196 that is the inlet for granules for processing by the granule meter assembly 180. FIG. 15 shows the drive gear 1406 and shaft connected to the stepper motor 128 and advances the gear mechanism 126 that compresses the chamber tubes 118. FIG. 15 shows the location of the non-moving granule meter assembly 180, positioned over a granule cup assembly 136 in position on the scale 156. FIG. 15 shows a granule cup assembly 136 in position to release its granular aggregate into the feed chute 188 to deliver the granular aggregate to the next process. FIG. 15 shows a granule cup assembly 136 in position to release its overweight granular aggregate into the feed chute 166 to deliver its granular aggregate to a container for overweight granular aggregates rejected during the automatic portion calibration process and for any overweight granular aggregates produced during production cycles. FIG. 15 depicts a side view of the drive gear 1230 that advances the rotational platform 150 into which the granule cup assemblies 136 are fitted. The rotational platform may also be advanced using a central shaft directly connected to a stepper motor or solenoid ratchet mechanism. FIG. 15 shows the location of one of four the worm gears (screw) 1430 that contracts or expands the distance between the screed plate 133 and the Base Plate 1173 of the volumetric assembly. Each of the gears 1430 are rotated by a gear 126a, 126c, 126f, 126h, respectively (FIG. 17).

FIG. 16 is a drawing showing a side view of one complete modular assembly. FIG. 16 shows the granule source inlet 1190 to the volumetric assembly 114. FIG. 16 shows the location of the worm gears (screw) 1430 that contracts or expands the distance between the screed plate 133 and the base plate 1173 of the volumetric assembly. FIG. 16 shows the location of the non-moving granule meter assembly 180 and the stepper motor 1128 that powers its internal conveyors. FIG. 16 depicts a side view of the drive gear that advances the rotational platform 150 into which the granule cup assemblies 136 are fitted. FIG. 16 depicts the granule hopper 196 that is the inlet for granules for processing by the granule meter assembly 180. FIG. 16 depicts the side of the gear mechanism 126 that compresses the spring loaded chamber tubes 118 causing the chamber tubes to telescope, uniformly expanding or reducing the interior volume of each chamber 118, thereby expanding or reducing the volume of initially portioned material as needed. FIG. 16 depicts the location of the drive gear 144 for rotating the volumetric assembly 114. FIG. 16 shows the drive gear and shaft 1406 connected to the stepper motor and advances the gear mechanism 126 that compresses the chamber tubes 118. FIG. 16 shows the feed chute 188 that delivers the granular aggregate to the next process. FIG. 16 shows the feed chute 166 that delivers granules to the container for overweight granular aggregates rejected during the automatic portion calibration process and for any overweight loads produced during production cycles.

Figure 17:
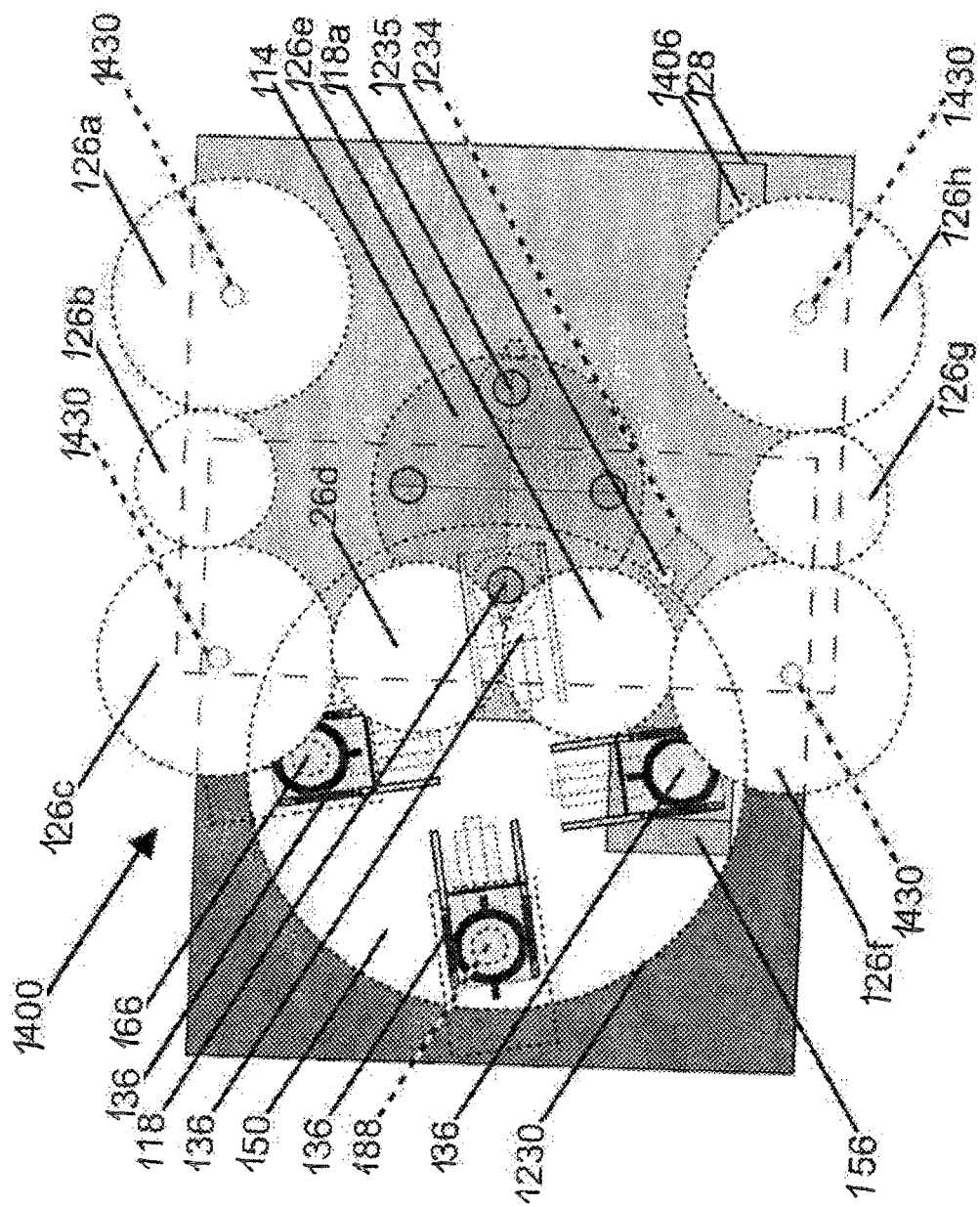
FIG. 17 is a plan view of the apparatus of FIG. 15.

FIG. 17 is a drawing showing a top view of one complete modular assembly 1400. FIG. 17 shows the location of a volumetric chamber 118 positioned to drop its load into a granule cup assembly 136. FIG. 17 shows the top of the rotational platform 150 into which the granule cup assemblies are fitted. FIG. 17 shows a granule cup assembly positioned over the feed chute 188 that delivers the granular aggregate to the next process. FIG. 17 shows a granule cup assembly in position on the scale where the granule meter assembly 180 deposits individual granules as needed to achieve the target weight specification. FIG. 17 depicts the location of a granule cup assembly 136 positioned over the feed chute 166 that delivers granules to the container for overweight granular aggregates rejected during the automatic portion calibration process and for any overweight loads produced during production cycles. FIG. 17 identifies the first of eight gears 126a-126h in the gear mechanism that compresses the spring loaded chamber tube assembly 118 causing the chamber tube assembly to telescope, uniformly expanding or reducing the interior volume of each chamber 118, thereby expanding or reducing the volume of initially portioned material as needed. Gears 126a, 126c, 126f, and 126h drive the screws 1430 while gears 126b, 126d, 126e and 126g are idler gears that ensure common rotation direction for gears 126a, 126c, 126f, 126h. FIG. 17 indicates the chamber plates 1202, 1204. FIG. 17 shows one 118a of the telescoping chamber tubes 118 in position to receive granules from the granule hopper and that is the inlet to modular assemblies for granule portioning. FIG. 17 shows the drive gear and shaft 1235 connected to the stepper motor and advances the gear mechanism 1230 that advances the rotational platform 150 into which the granule cup assemblies 136 are fitted. FIG. 11 shows the drive gear and shaft 1406 connected to the stepper motor 128 and advances the gear mechanism 126a-126h that compresses the chamber plates 133, 1173 that thereby expand or reduce the volume of initially portioned material as needed.

Figure 18:
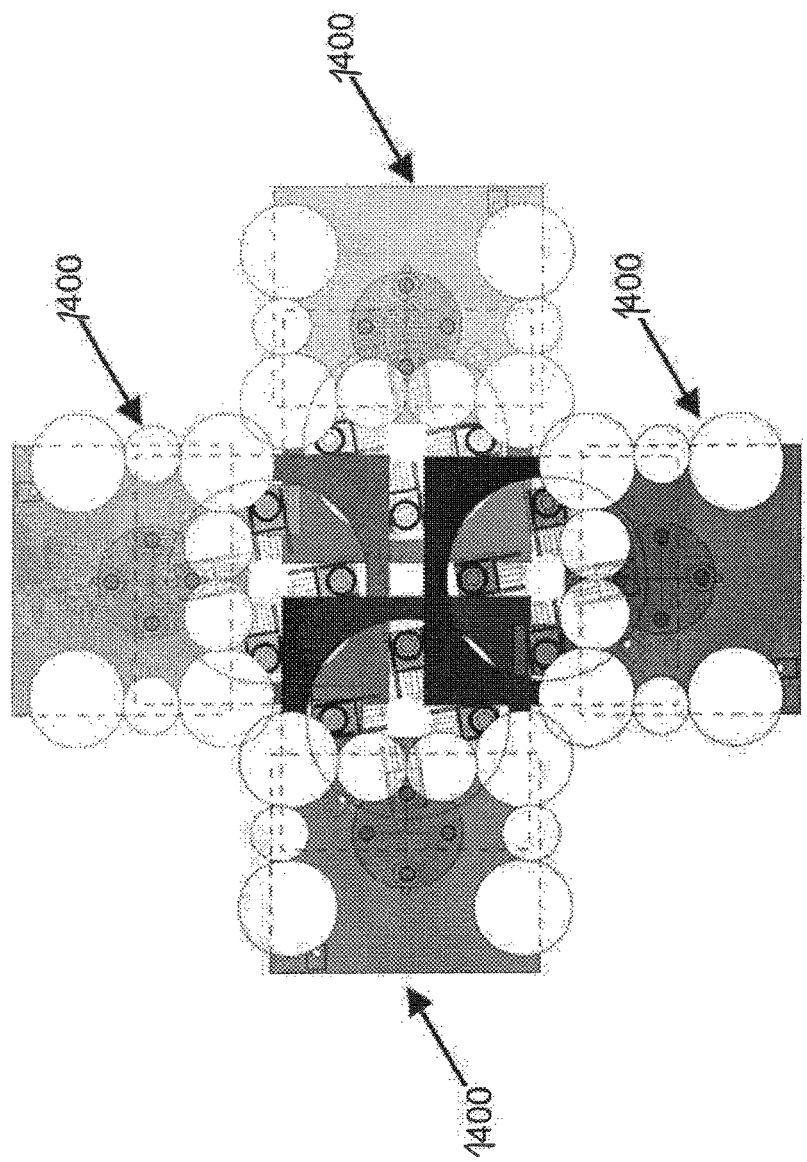
FIG. 18 is a plan view of a combination of four apparatus according to FIG. 15.

FIG. 18 is a drawing showing a top view of four modular assemblies 1400, arranged in a cross pattern that complete one cycle assembly. Any number of modular assemblies can be combined in this fashion, as needed, to increase the rate of production of precise granule portions to match the feed rate of subsequent processing equipment in any application.

Figure 19:
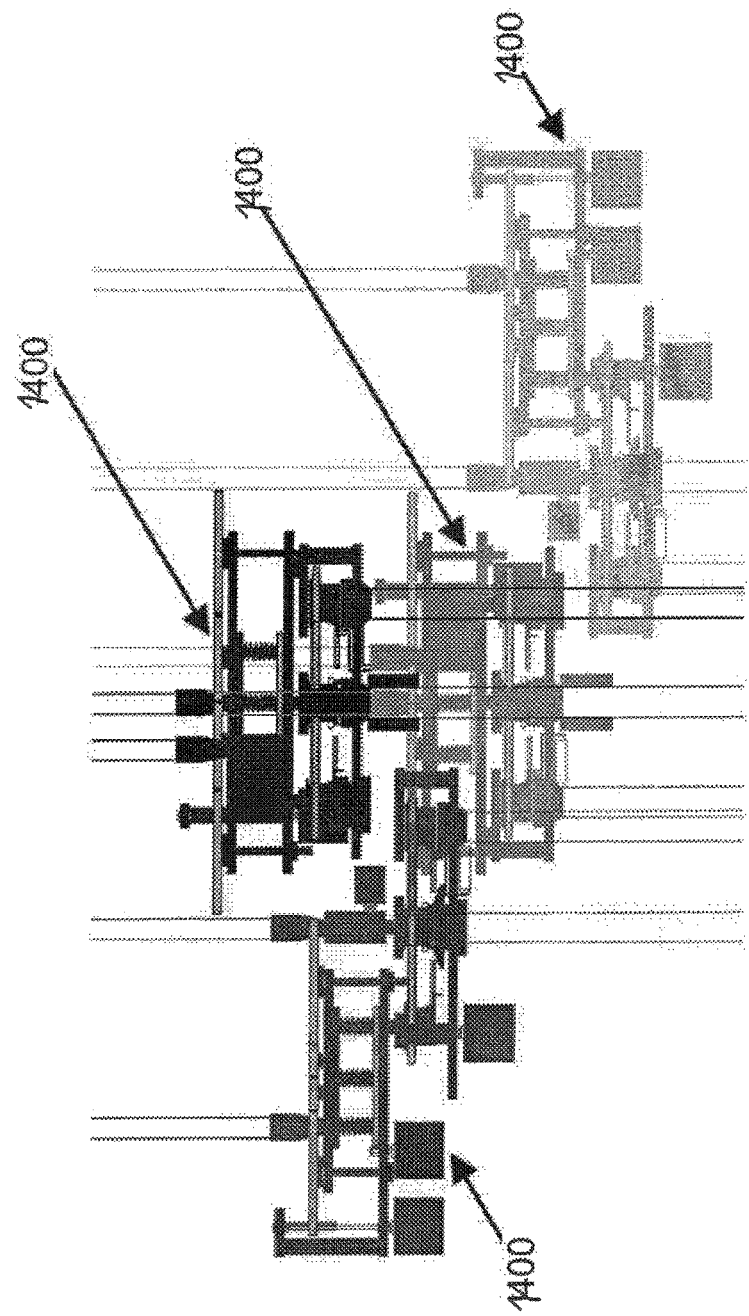
FIG. 19 is a front view of the apparatus of FIG. 18.

FIG. 19 is a drawing showing a side view of four modular assemblies that complete one cycle assembly.

Figure 20:
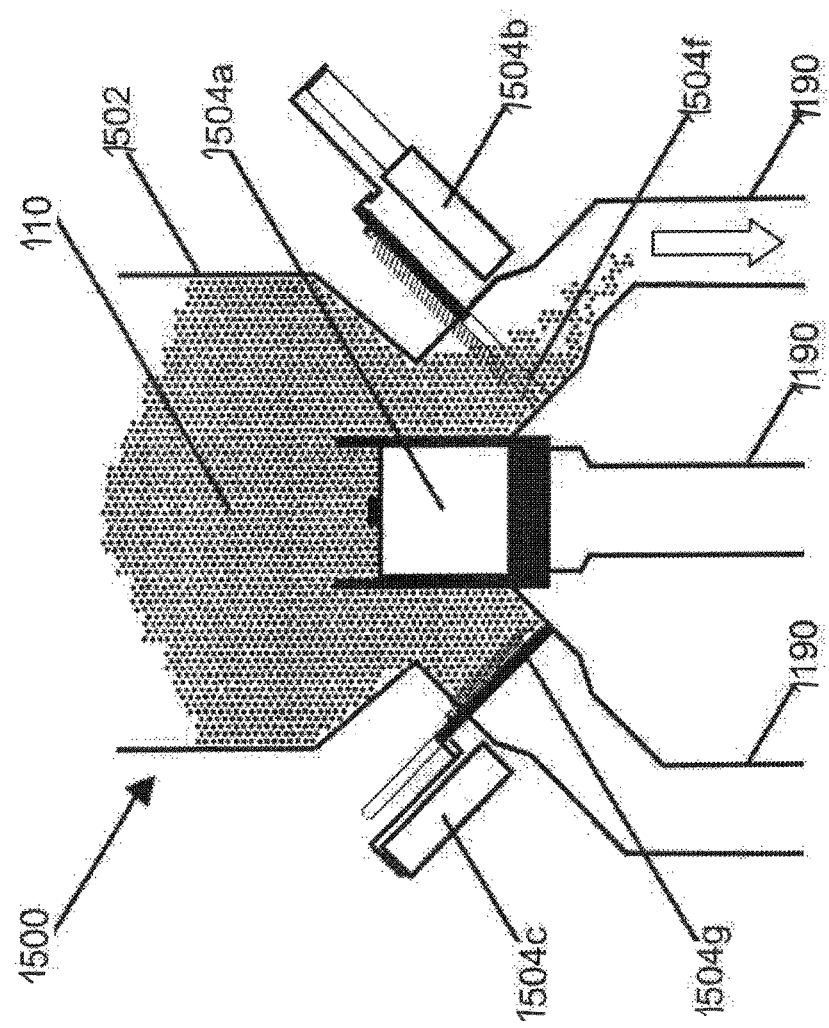
FIG. 20 is a schematic, sectional view of a granule source hopper for the apparatus of FIG. 18.

FIG. 20 is a diagram showing a side view of a granule source hopper 1500, one of two for each complete cycle assembly. FIG. 20 shows a hopper 1500 holding granules to be distributed to each of the modular assemblies by means of four solenoid controlled gates 1504a-d (three shown). FIG. 20 shows the relative position of the solenoid of one of the solenoid controlled gates 1504a. An identical gate is on the directly opposite side of the assembly (not shown). FIG. 20 shows a side view of one of the solenoid gates 1504b with the solenoid actuated, and the gate 1504f in the open position to allow granules to fall into the chute that feeds the granule hopper 196 that is the inlet for granules for processing by the granule meter assembly 180, or alternatively, the granule hopper 112 that is the inlet for granules for processing by the volumetric assembly 114. FIG. 20 shows a side view of the solenoid gate 1504c, opposite the solenoid gate 1504b, with solenoid in the idle position and the gate in the closed position to restrict the flow of granules.

Although separate hoppers 112, 196 are shown in the drawings, a common hopper could be used to feed both the volumetric assembly 114 and the metering assembly 180 (or 180') though tubes or ducts. Alternatively, a common hopper, such as the hopper 1500, could feed the separate hoppers 112, 196 though tubes or ducts.

FIG. 21 is a diagram showing a side view of a granule consolidation assembly 1600 for one complete cycle assembly including timing gates 1604a, 1604b, 1604c for sequentially feeding subsequent processing equipment such as a cartridge loading machine. The diagram shows a side view of three timing gates with a fourth (not shown) behind the center gate 1604c. The purpose of the device is to time the release of granular aggregates previously released into each of the four feed chutes 188 into which granule cup assemblies release granular aggregates to the next process. The device is utilized to serially feed granular aggregate at a rate exceeding the processing rate of an individual modular assembly 1400 to processing equipment such as, as an example, a high speed automatic cartridge loader. FIG. 21 shows a solenoid actuated gate 1604a that releases retained granular aggregate in series with each of the other gates. FIG. 21 shows the reverse side of a gate 1604b releasing its granular aggregate. FIG. 21 shows how serially released granular aggregate product is consolidated to the feed tube 1604f of an external processor.

FIG. 22 is a diagram showing a side view of tubes 166 consolidated to flow into the reject container 170 where overweight granular aggregates rejected during the automatic portion calibration process, and any overweight granular aggregates produced during production cycles from each of four modular assemblies that together comprise one complete cycle assembly, are collected.

Figure 23:
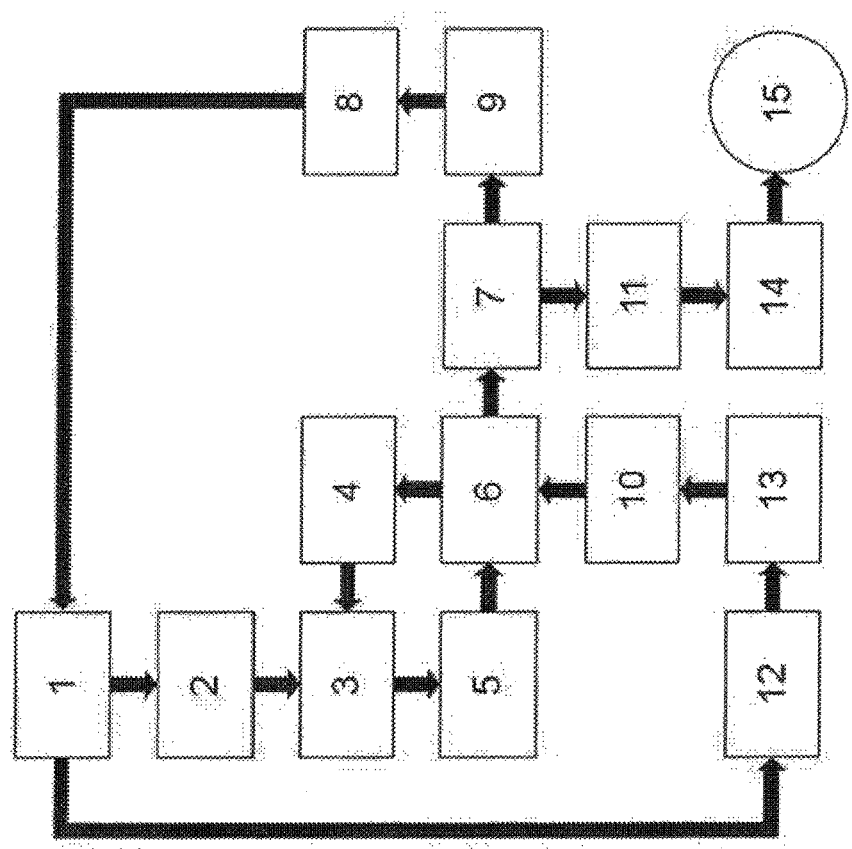
FIG. 23 is a process flow diagram for the apparatus of FIG. 15.

FIG. 23 is a process flow diagram of one complete modular assembly. The steps happen in overlapping time sequences and are not necessarily sequential. The steps and components of the flow diagram are as follows: Step 1 is the operation of the granule source hopper 1502; Step 2 is the operation of the release solenoid 1504b-granule source hopper for the volumetric assembly; Step 3 is the operation of the stepper motor 148 for the volumetric assembly; Step 4 is the operation of the stepper motor for the volumetric assembly volume adjustment 128; Step 5 is the operation of the stepper motor 1234 for the rotational platform; Step 6 is the operation of the digital scale 156; Step 7 is the operation of the stepper motor 1234 for the rotational platform; Step 8 is the operation of the release solenoid 1504b for the granule source hopper to the granule meter assembly 180; Step 9 is the operation of the release solenoid 1328 for the overweight chute release; Step 10 is the operation of the photo sensor 1160 for the granule meter conveyor apex; Step 11 is the operation of the release solenoid 1328 for the consolidation chute; Step 12 is the operation of the stepper motor 1128 for the granule meter assembly 180; Step 13 is the operation of the photo sensor for the granule meter outlet 1176; Step 14 is the operation of the release solenoid 1604b for the granule consolidation assembly; and Step 15 represents the next process depending on the application.

Figure 24A:
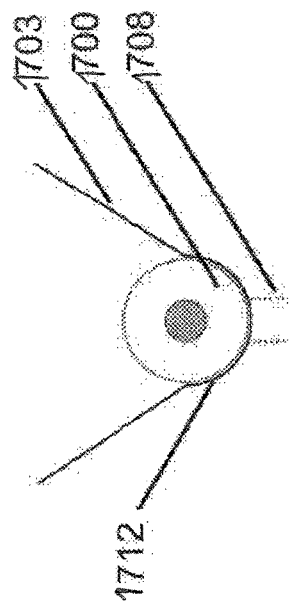
FIG. 24A is a sectional view taken generally along line 18A-18A in FIG. 24.n end view
Figure 24:
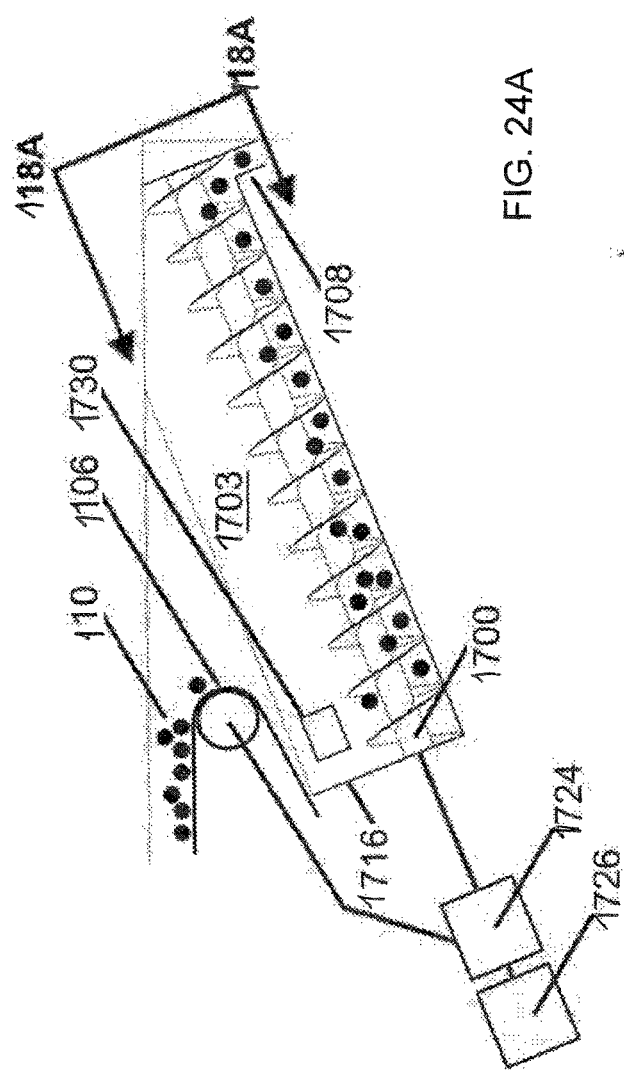
FIG. 24 is a schematic sectional view of an alternate dispensing conveyor to that shown in FIG. 11.

FIG. 24 illustrates an alternate embodiment granule meter assembly 180' to the granule meter assembly 180 shown in FIGS. 11 and 12. An inclined screw conveyor 1700 replaces the inclined conveyor 1110 detailed in FIGS. 11 and 12 of the application for Precision Portioning of Granules by Weight. The horizontal conveyor 1106 deposits granules 110 in a V-shaped trough 1703. The screw conveyor 1700 includes an apex port 1708 to release individual granules. The sensor is not shown, but is not deleted. The V-shaped trough 1703 is open the entire length of the conveyor to avoid slicing or crushing granules of any shape. The trough 1703 has a hemi-cylindrical bottom 1712 to contain and escalate granules 110. FIG. 24A is a side view of the screw conveyor. The V-shaped trough 1703 includes a back wall 1716 to prohibit back-spill of the granules.

As described in FIG. 11, the horizontal conveyor 1106 deposits granules 110 into the V-shaped trough 1703 at a rate slower than they are escalated by the screw conveyor. A gear mechanism 1724 and motor 1726 to drive the two conveyors 1106, 1700 are shown schematically. The brushes in FIGS. 11 and 12 have been deleted. The V-shaped trough 1703 is vibrated by means of a motor 1730 with an off-axis weight or transducer. All other aspects of the granule meter assembly 180 remain the same.

The gates 1504a-1504c and 1604a-1604c can be spring loaded and configured like the hatch 1330, spring 1331 and solenoid 1328 shown in FIG. 14.

Each specific and precisely graduated increment of propellant class is differentiated by packaging and descriptive materials marketed as separate and distinct SKUs. Customers are enabled to effectuate the advantageous use of finished product containing an available optimal load of propellant for a particular, individual, and specific rifle. By experimenting within the range of specific and precisely graduated product classes for a particular firearm's caliber and desired cartridge configuration, customers are able to determine which of the classes of product exhibits the best accuracy with their particular, individual, and specific rifle. Thereafter, to maintain optimal accuracy with the particular individual firearm, customers need only select the same packaged product and class thereof previously determined by them to be optimal, unless and until the firearm is materially modified.

In the event of a material change or modification of the firearm affecting barrel harmonics, such as the addition of a scope, alternate stock, a vibration dampener, a flash suppressor, or other equipment, customers may again experiment within the range of specific and precisely graduated product classes pertaining to a desired caliber and cartridge configuration to determine which of the classes exhibits the best accuracy with their particular, individual, and specific firearm. Thereafter, to maintain optimal accuracy with the particular individual firearm, customers need only select the same packaged product and class thereof previously determined to be optimal, unless and until the firearm is again materially modified.

Although the invention has been explained in relation to its preferred embodiment, it is to be understood that many other possible modifications and variations can be made without departing from the spirit and scope of the invention as hereinafter claimed.

The invention claimed is:

1. A method of providing ammunition cartridges for use in a rifle to enable the identification and selection of the most accurate propellant load weight for the rifle, comprising the steps of:

providing a first kit comprising multiple cartridges, wherein at least some of the multiple cartridges are differentiated by propellant load weight, and wherein the value of differentiation of propellant load weight between cartridges is a number of grains selected from the range of 0.1 grains to 0.5 grains; and wherein each cartridge has a different target propellant load weight, and is manufactured by means of an automated granule portioning system comprising:

a volumetric assembly comprising a top plate, a bottom plate, and a telescopic chamber engaged with the top plate and the bottom plate, the telescopic chamber comprising a plurality of chamber tubes, wherein the volume of the telescopic chamber is adjustably based upon the position of the top plate relative to the bottom plate, and the position of the top plate relative to the bottom plate is adjustable by a gear mechanism, the volumetric assembly being arranged to receive a portion of propellant granules into the telescopic chamber to fill the volume of the telescopic chamber;

a weighing device, the weighing device being capable of weighing the portion of propellant granules received in the telescopic chamber, and comparing the weight of the portion of granules to a target propellant load weight corresponding with the cartridge; and a motor, wherein the motor is capable of rotating the gear mechanism to adjust the volume of the telescopic chamber after the weighing device determines that the granule weight of the portion of granules is different than the target propellant load weight corresponding with the cartridge.

2. The method according to claim 1, further comprising the step of providing a plurality of additional kits of multiple cartridges, wherein at least some of the multiple cartridges of the additional kits are differentiated by propellant load weight, and wherein the value of differentiation of propellant load weight between cartridges is 0.1 grains, and wherein the propellant load weight of at least some of the cartridges of each additional kit is differentiated from the propellant load of at least one of the cartridges of the first kit by a value less than the value of differentiation of propellant load weight of the first kit.

3. The method according to claim 2, comprising the further steps of firing with a rifle the cartridges of the first kit in a rifle at a target to enable the identification and selection of the propellant load weight producing the least amount of random scatter on the target resulting from the firing of the cartridge in the first kit; and firing with the rifle the cartridges of one of the additional kits in the rifle at the target, the additional kit selected with the least value of differentiation of propellant load weight from the selected propellant load weight producing the least amount of random scatter from the first kit, to enable the identification and selection of the most accurate propellant load weight producing the least amount of random scatter on the target resulting from the firing of the cartridge in the additional kit.

4. The method according to claim 2, wherein each cartridge of the additional kits has a target propellant load weight, and is manufactured by means of the automated granule portioning system.

5. The method according to claim 1, wherein the automated granule portioning system further comprises a granule metering device comprising a plurality of conveyors that dispense granules to the first portion of granules.

6. The method according to claim 5, wherein the granule metering device comprises a photo sensor to verify the release of individual granules to the first portion of granules.

7. The method according to claim 1, wherein the motor is further capable of rotating the gear mechanism to adjust the volume of the telescopic chamber for another target propellant load weight corresponding with another cartridge.

8. The method according to claim 1, wherein the volumetric assembly comprises a plurality of telescopic chambers, and wherein the automated granule portioning system further comprises a hopper for holding the propellant granules;

a transport system having a first rotatable plate that holds the telescopic chambers rotationally spaced apart, and which rotates to place the telescopic chambers one at a time to receive the first portion of propellant granules from the hopper, and to position filled chambers one at a time over a fill station; and a plurality of weighing containers carried rotationally spaced apart on a second rotatable plate, located beneath the first rotatable plate, wherein rotation of the second rotatable plate positions a weighing container in the fill station to receive the first portion of propellant granules from each of the telescopic chambers, and further rotates to position a filled weighing container onto the weighing device, and further rotates to position the filled weighing container into a delivery station to deliver the propellant granules out of the weighing container for further processing.

9. The method according to claim 8, further comprising a granule metering station wherein a dispensing device dispenses granules into the filled weighing container while the filled weighing container is on the weighing scale, the dispensing device being in signal communication with the weighing scale to add a correct number of granules so that the first propellant load weight equals the target propellant load weight.

10. The method according to claim 1, wherein the first kit is provided for a particular rifle based on individual rifle make and model.

11. A kit of ammunition cartridges for use in a rifle to enable the identification and selection of the most accurate cartridge propellant weight for the rifle, the kit comprising multiple cartridges wherein at least some of the multiple cartridges are differentiated by propellant weight such that the specific impulse imparted by a volume of differentiated propellant modifies the muzzle velocity of the projectile.

12. A method of supplying a rifle with cartridges, comprising the steps of:

providing a first plurality of classes within a first group of cartridges, wherein the classes are classified by specific and precisely graduated weighted increments of propellant load contained in the cartridges of each class relative to the cartridges of each other class of the first group of cartridges;

firing a rifle at a target with the first plurality of classes of cartridges;

selecting a class of the first group of cartridges with the greatest accuracy in the firing determined by the least amount of random scatter on the target produced by the class of cartridges;

providing a second plurality of classes within a second group of cartridges, wherein the classes of the second group of cartridges are classified by specific and precisely graduated weighted increments of propellant load contained in the cartridges of each class relative to the cartridges of each other class of the second group of cartridges, and wherein the weighted increments of the second group of cartridges is less than the weighted increments of the first group of cartridges, and further wherein the propellant load of at least one of the second group of cartridges is within the weighted increment of the second group of cartridges from the class selected from the first group of cartridges;

firing the rifle at the target with the second plurality of classes of cartridges; and selecting a class of the second group of cartridges with the greatest accuracy in the test firing determined by the least amount of random scatter on the target produced by the class of cartridges.

13. The method according to claim 12, wherein the steps of firing are each further defined by the step of firing the rifle with an attachment affixed thereto at the target with the multiple classes of cartridges, the attachment selected from the group consisting of: a scope, a stock and a flash guard.

14. The method according to claim 12, wherein the step of providing a plurality of classes is further defined in that each class of the multiple classes of the first group of cartridges is separated by a value of differentiation of propellant load weight between cartridges is a number of grains selected from the range of 0.1 grains to 0.5 grains.

15. The method according to claim 10, wherein the first kit is provided for a particular rifle further based on an attachment affixed to the rifle, the attachment selected from the group consisting of: a scope, a stock, and a flash guard.

16. The kit according to claim 11, wherein each cartridge has a different target propellant load weight, and is manufactured by means of an automated granule portioning system comprising:

a volumetric assembly comprising a top plate, a bottom plate, and a telescopic chamber engaged with the top plate and the bottom plate, the telescopic chamber comprising a plurality of chamber tubes, wherein the volume of the telescopic chamber is adjustably based upon the position of the top plate relative to the bottom plate, and the position of the top plate relative to the bottom plate is adjustable by a gear mechanism, the volumetric assembly being arranged to receive a portion of propellant granules into the telescopic chamber to fill the volume of the telescopic chamber;

a weighing device, the weighing device being capable of weighing the portion of propellant granules received in the telescopic chamber, and comparing the weight of the portion of granules to a target propellant load weight corresponding with the cartridge; and a motor, wherein the motor is capable of rotating the gear mechanism to adjust the volume of the telescopic chamber after the weighing device determines that the granule weight of the portion of granules is different than the target propellant load weight corresponding with the cartridge.

17. The kit according to claim 16, wherein the volumetric assembly comprises a plurality of telescopic chambers, and wherein the automated granule portioning system further comprises:

a hopper for holding the propellant granules;

a transport system having a first rotatable plate that holds the telescopic chambers rotationally spaced apart, and which rotates to place the telescopic chambers one at a time to receive the first portion of propellant granules from the hopper, and to position filled chambers one at a time over a fill station; and a plurality of weighing containers carried rotationally spaced apart on a second rotatable plate, located beneath the first rotatable plate, wherein rotation of the second rotatable plate positions a weighing container in the fill station to receive the first portion of propellant granules from each of the telescopic chambers, and further rotates to position a filled weighing container onto the weighing device, and further rotates to position the filled weighing container into a delivery station to deliver the propellant granules out of the weighing container for further processing.

18. The method according to claim 12, wherein each cartridge has a target propellant load weight, and is manufactured by means of an automated granule portioning system comprising:

a volumetric assembly comprising a top plate, a bottom plate, and a telescopic chamber engaged with the top plate and the bottom plate, the telescopic chamber comprising a plurality of chamber tubes, wherein the volume of the telescopic chamber is adjustably based upon the position of the top plate relative to the bottom plate, and the position of the top plate relative to the bottom plate is adjustable by a gear mechanism, the volumetric assembly being arranged to receive a portion of propellant granules into the telescopic chamber to fill the volume of the telescopic chamber;

a weighing device, the weighing device being capable of weighing the portion of propellant granules received in the telescopic chamber, and comparing the weight of the portion of granules to a target propellant load weight corresponding with the cartridge; and a motor, wherein the motor is capable of rotating the gear mechanism to adjust the volume of the telescopic chamber after the weighing device determines that the granule weight of the portion of granules is different than the target propellant load weight corresponding with the cartridge.

19. The method according to claim 18 wherein the volumetric assembly comprises a plurality of telescopic chambers, and wherein the automated granule portioning system further comprises a hopper for holding the propellant granules;

a transport system having a first rotatable plate that holds the telescopic chambers rotationally spaced apart, and which rotates to place the telescopic chambers one at a time to receive the first portion of propellant granules from the hopper, and to position filled chambers one at a time over a fill station; and a plurality of weighing containers carried rotationally spaced apart on a second rotatable plate, located beneath the first rotatable plate, wherein rotation of the second rotatable plate positions a weighing container in the fill station to receive the first portion of propellant granules from each of the telescopic chambers, and further rotates to position a filled weighing container onto the weighing device, and further rotates to position the filled weighing container into a delivery station to deliver the propellant granules out of the weighing container for further processing.

* * * * *